(12) United States Patent
Merrit et al.

(10) Patent No.: US 11,858,661 B2
(45) Date of Patent: Jan. 2, 2024

(54) METHOD OF MANUFACTURING AN ASSEMBLY HAVING A NOMINAL THICKNESS SKIN PANEL

(71) Applicant: The Boeing Company, Chicago, IL (US)

(72) Inventors: Benjamin S. Merrit, Mukilteo, WA (US); Hsien-Lin Huang, Lynnwood, WA (US); Mark Abdouch, Mukilteo, WA (US); Nathan A. Secinaro, Seattle, WA (US); Daniel Bracy, Everett, WA (US)

(73) Assignee: The Boeing Company, Arlington, VA (US)

( * ) Notice: Subject to any disclaimer, the term of this patent is extended or adjusted under 35 U.S.C. 154(b) by 33 days.

(21) Appl. No.: 17/650,619

(22) Filed: Feb. 10, 2022

(65) Prior Publication Data
US 2023/0249844 A1 Aug. 10, 2023

(51) Int. Cl.
*B64F 5/10* (2017.01)
*B64C 3/26* (2006.01)
(Continued)

(52) U.S. Cl.
CPC ............ *B64F 5/10* (2017.01); *B29C 65/7808* (2013.01); *B29D 99/0014* (2013.01);
(Continued)

(58) Field of Classification Search
CPC ... B64F 5/10; B29C 65/7808; B29D 99/0014; B64C 1/064; B64C 1/065; B64C 3/26
See application file for complete search history.

(56) References Cited

U.S. PATENT DOCUMENTS 6,134,940 A * 10/2000 Banks ...................... B21J 15/28
72/476
7,682,112 B2 * 3/2010 Panczuk ................... B23Q 1/01
409/199
(Continued)

FOREIGN PATENT DOCUMENTS

CA 2829899 4/2015

OTHER PUBLICATIONS

Dufieux, Innovative Large Millings Machines—Mirror Milling System, brochure, retrieved on Dec. 4, 2021.
(Continued)

*Primary Examiner* — Lawrence Averick

(57) ABSTRACT

A method of manufacturing a panel assembly includes supporting the panel assembly in a free state using a holding fixture. The panel assembly has a skin panel, and sacrificial material coupled to a skin panel inner surface. The method includes acquiring a free state outer surface contour of the panel assembly by scanning a skin panel outer surface while the panel assembly is supported by the holding fixture. The method also includes developing a numerically controlled (NC) machining program having cutter paths configured for machining the interface locations to an inner surface contour that reflects nominal thicknesses of the panel assembly based off of the free state outer surface contour. In addition, the method includes machining the sacrificial material at the interface locations by moving a cutter along the cutter paths while the panel assembly is supported by the holding fixture.

20 Claims, 30 Drawing Sheets

(51) Int. Cl.
*B29C 65/78* (2006.01)
*B64C 1/06* (2006.01)
*B29D 99/00* (2010.01)

(52) U.S. Cl.
CPC .............. *B64C 1/064* (2013.01); *B64C 1/065* (2013.01); *B64C 3/26* (2013.01)

(56) References Cited

U.S. PATENT DOCUMENTS

| | | | |
|---|---|---|---|
| 8,695,219 B2* | 4/2014 | Munk | B64F 5/10 |
| | | | 29/281.6 |
| 9,586,367 B2 | 3/2017 | Drewett | |
| 10,814,459 B2* | 10/2020 | Borowicz | B25J 15/0616 |
| 11,181,887 B2* | 11/2021 | Engelbart | G05B 19/4207 |
| 11,312,472 B2* | 4/2022 | Brakes | B64F 5/10 |
| 2007/0274797 A1* | 11/2007 | Panczuk | B23Q 1/626 |
| | | | 409/131 |
| 2009/0228134 A1 | 9/2009 | Munk | |
| 2019/0247983 A1* | 8/2019 | Borowicz | B65G 47/917 |
| 2020/0108910 A1* | 4/2020 | Brakes | B64C 3/26 |
| 2020/0192331 A1* | 6/2020 | Engelbart | G01N 29/0645 |

OTHER PUBLICATIONS

EPO, European Search Report for application No. EP22212948, dated Jun. 22, 2023.

\* cited by examiner

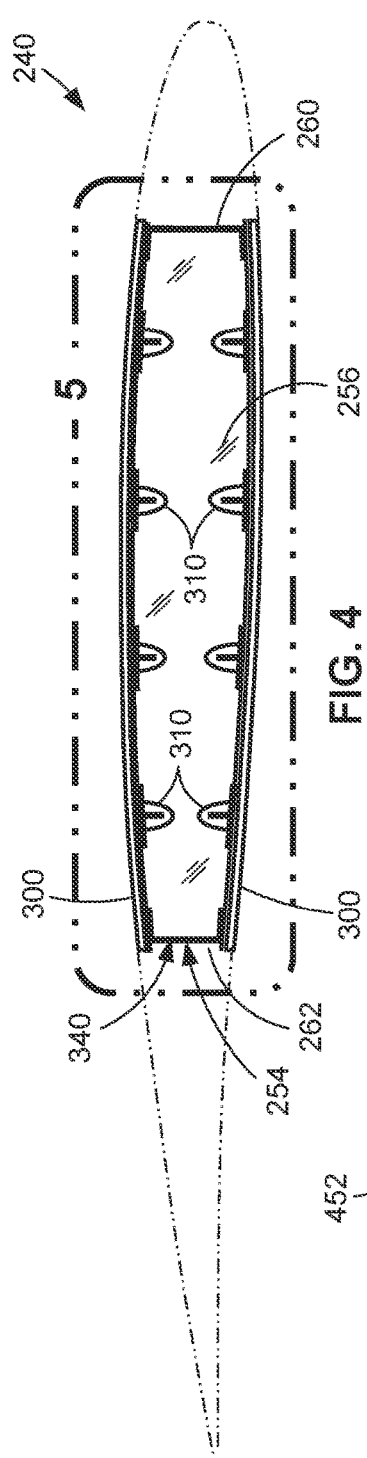
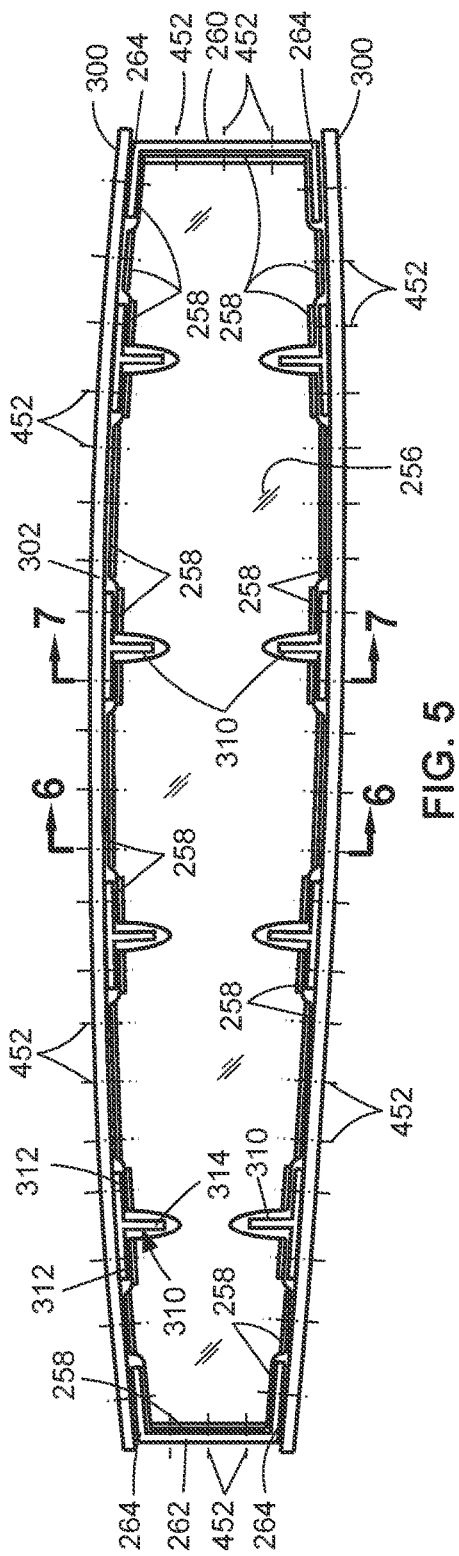

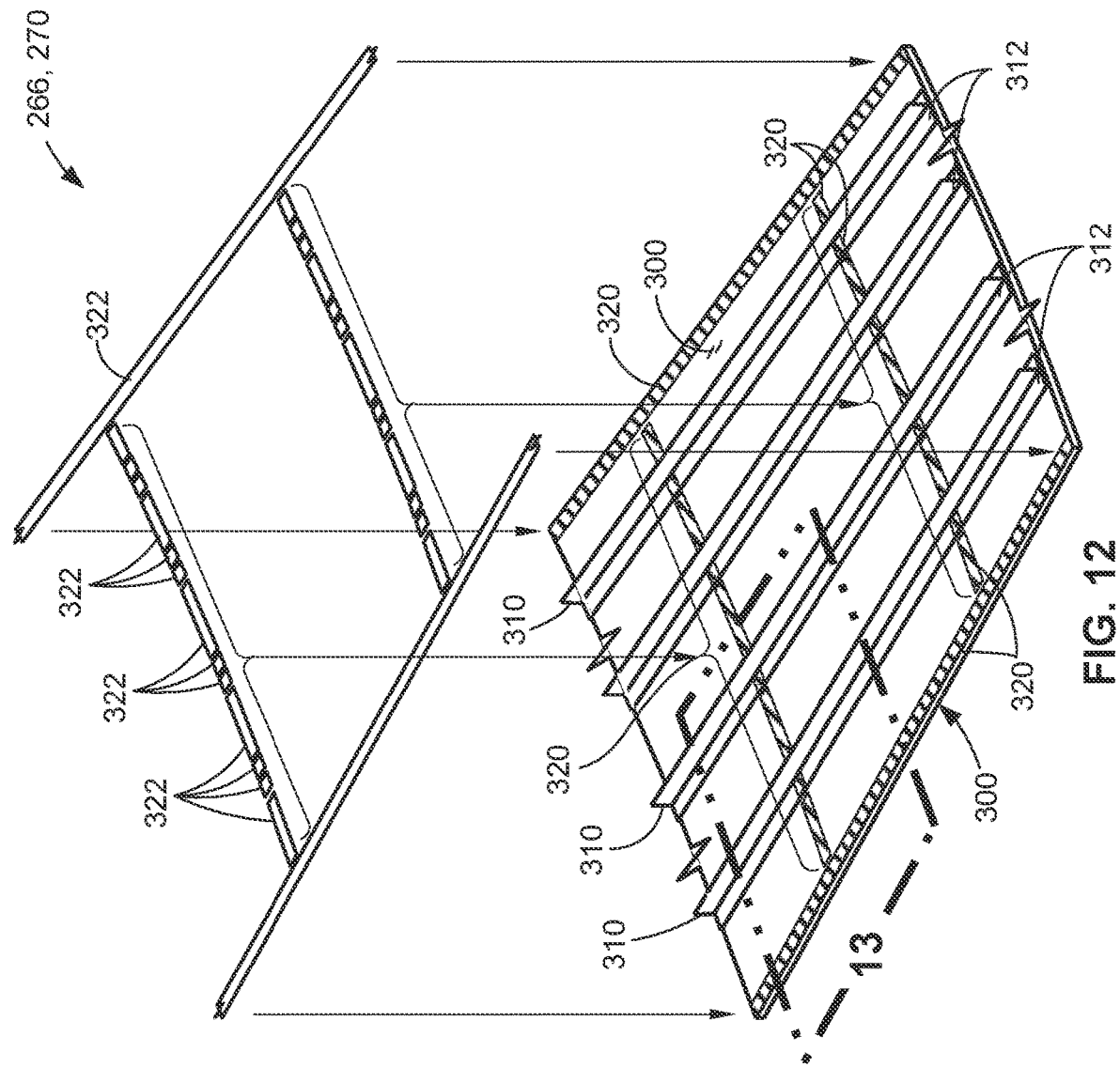

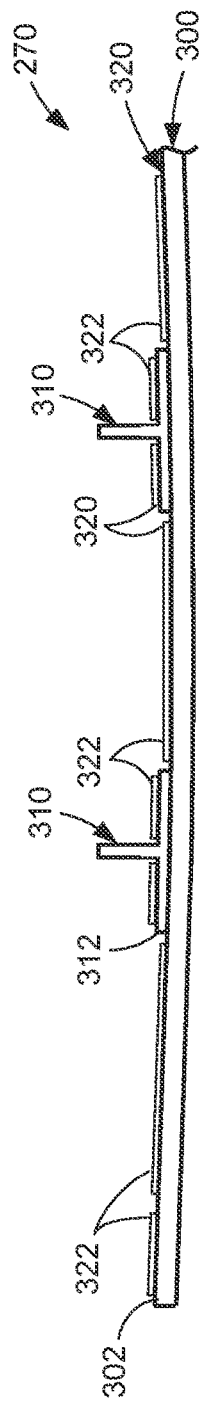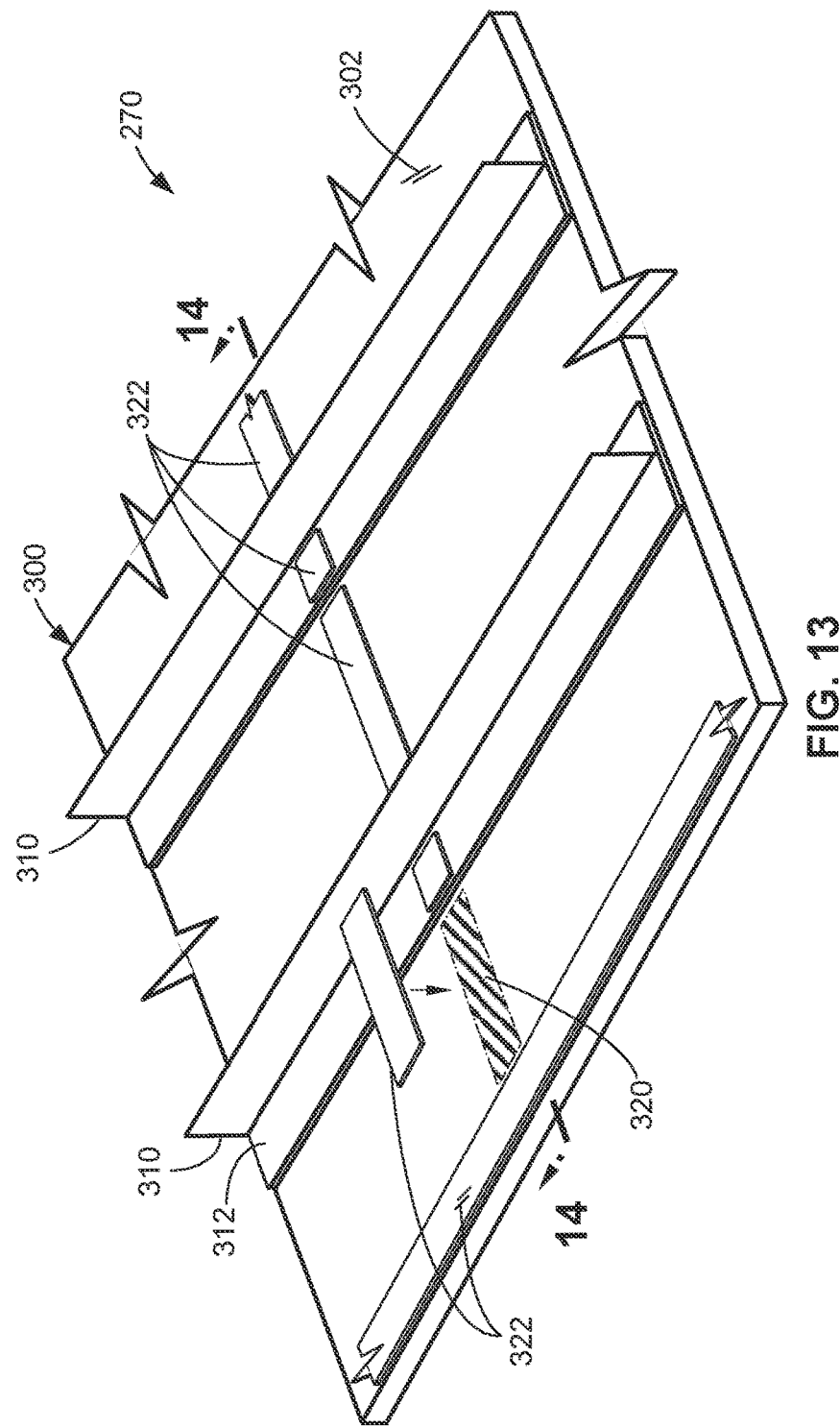

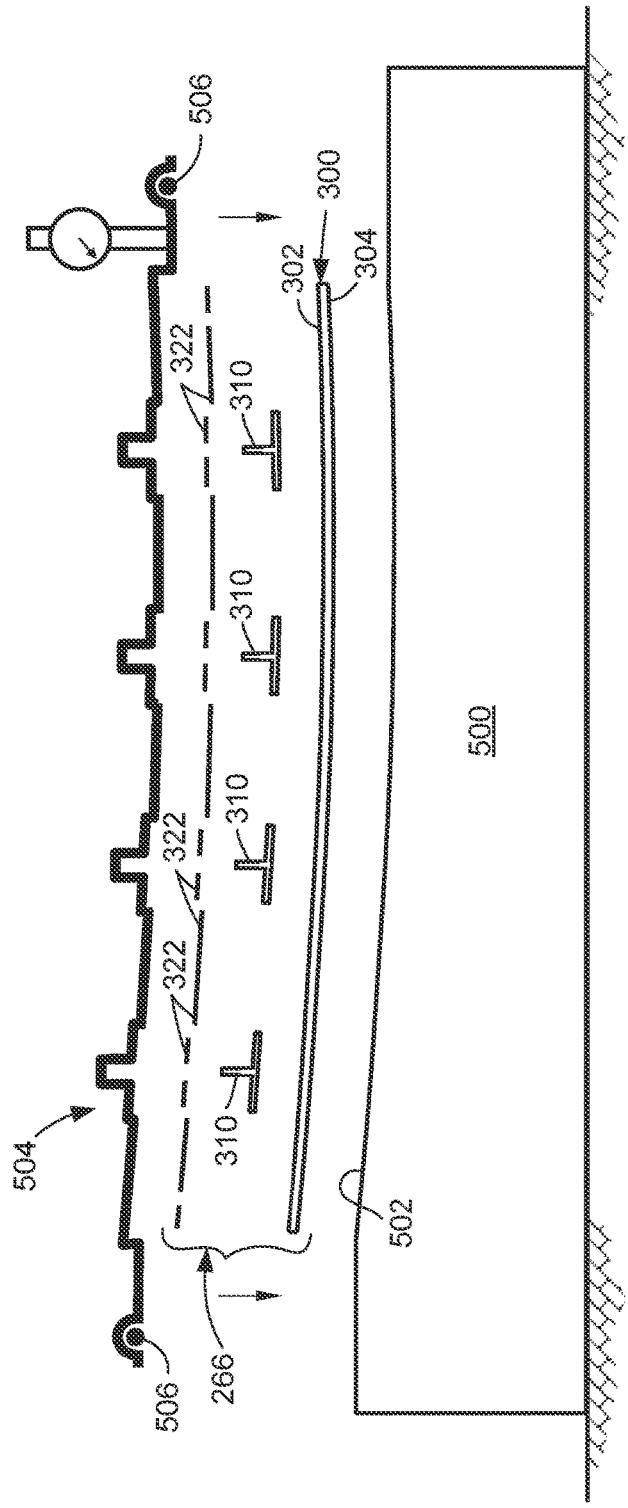
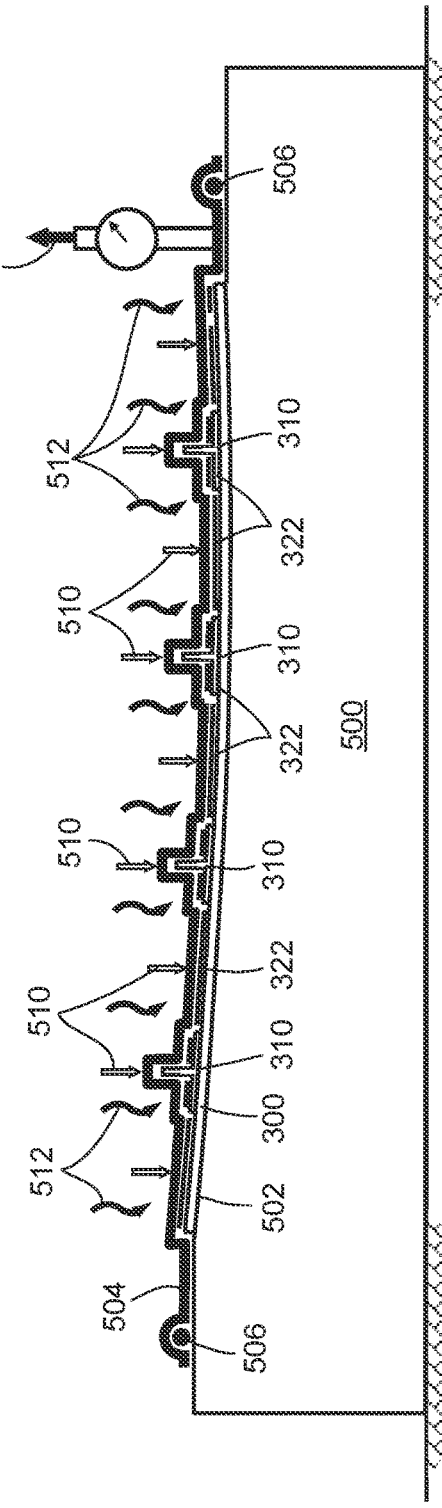

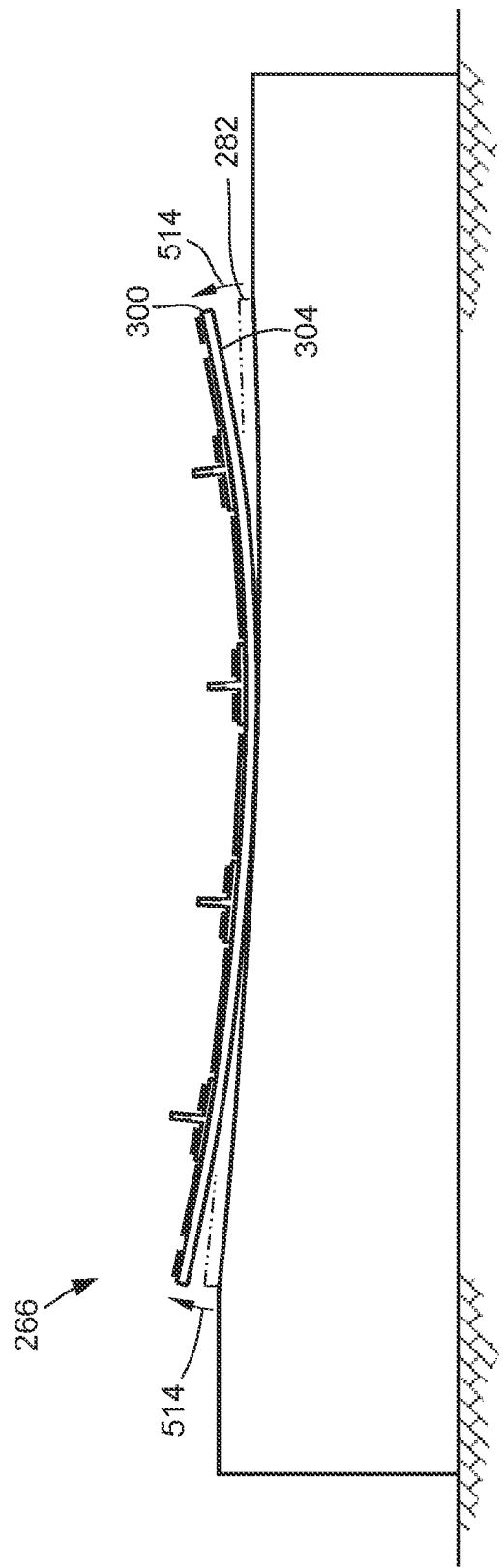

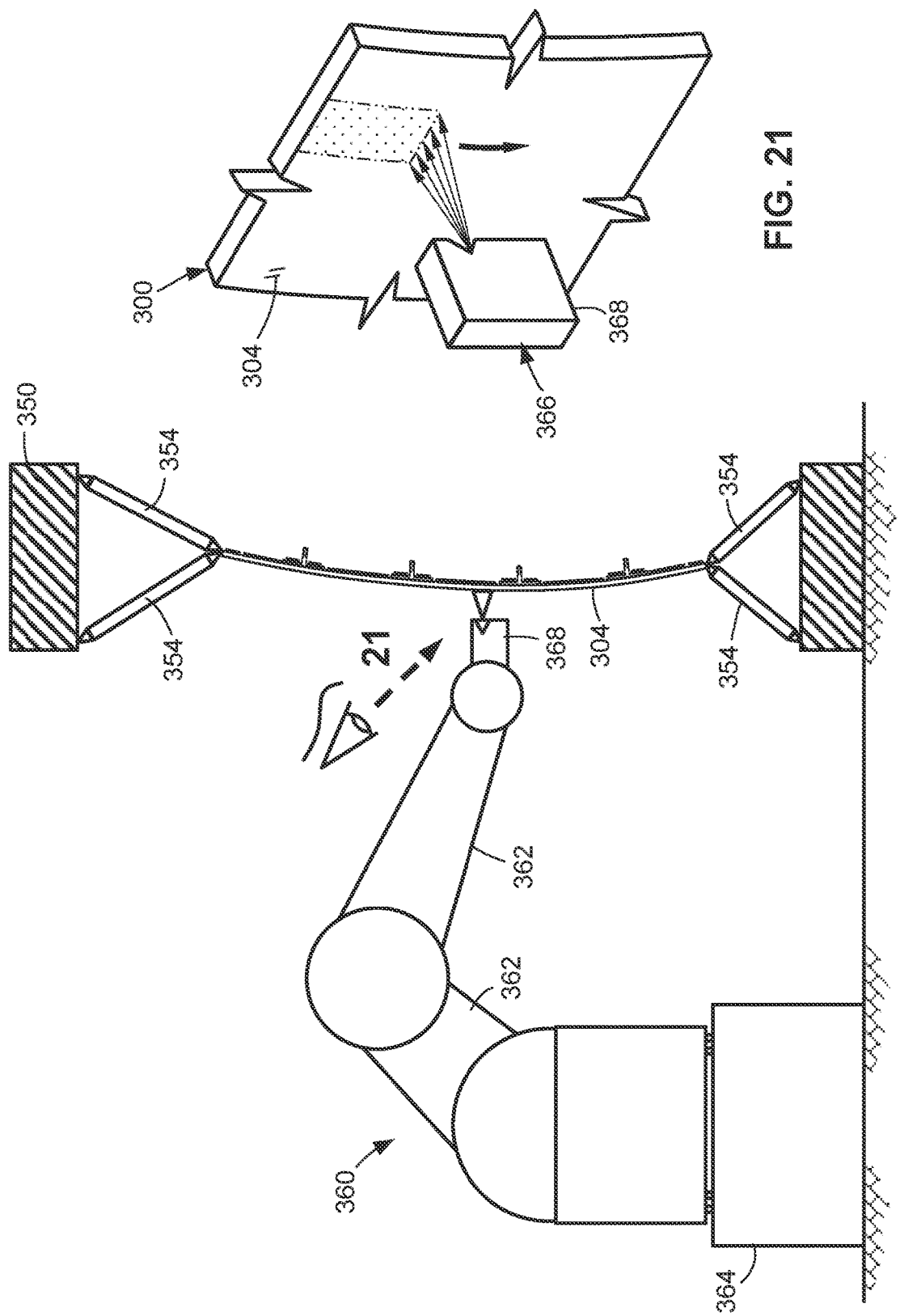

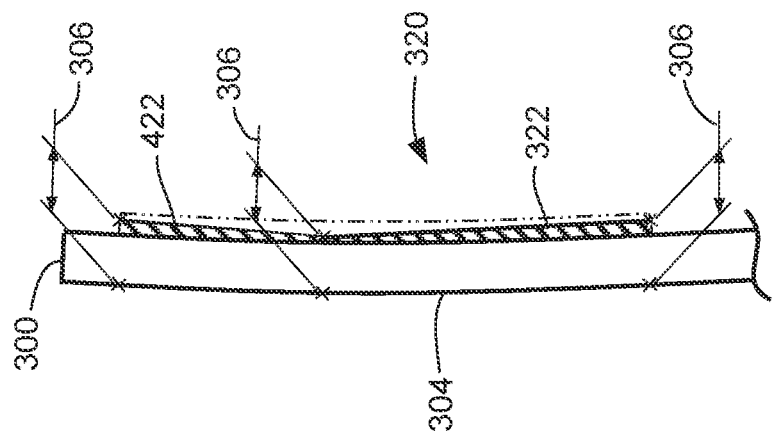
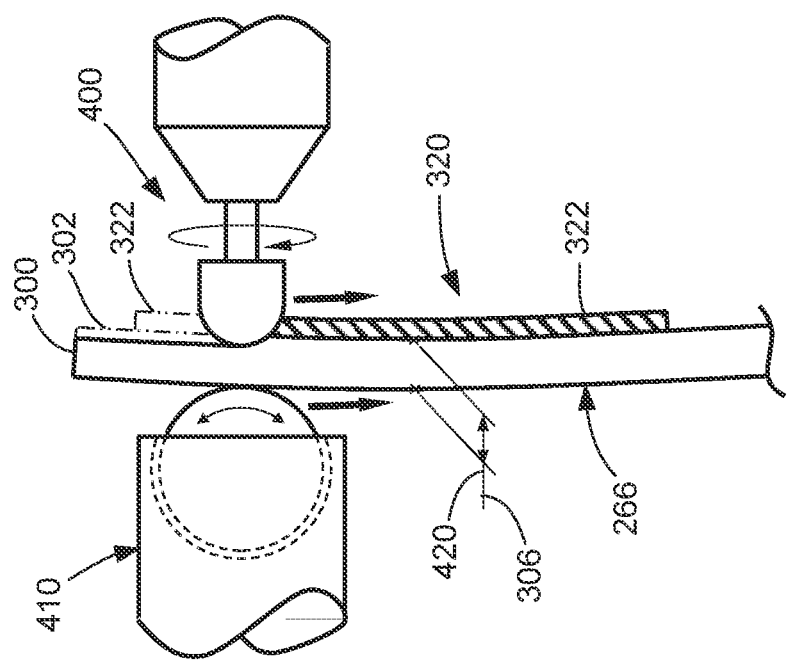
FIG. 30
FIG. 29

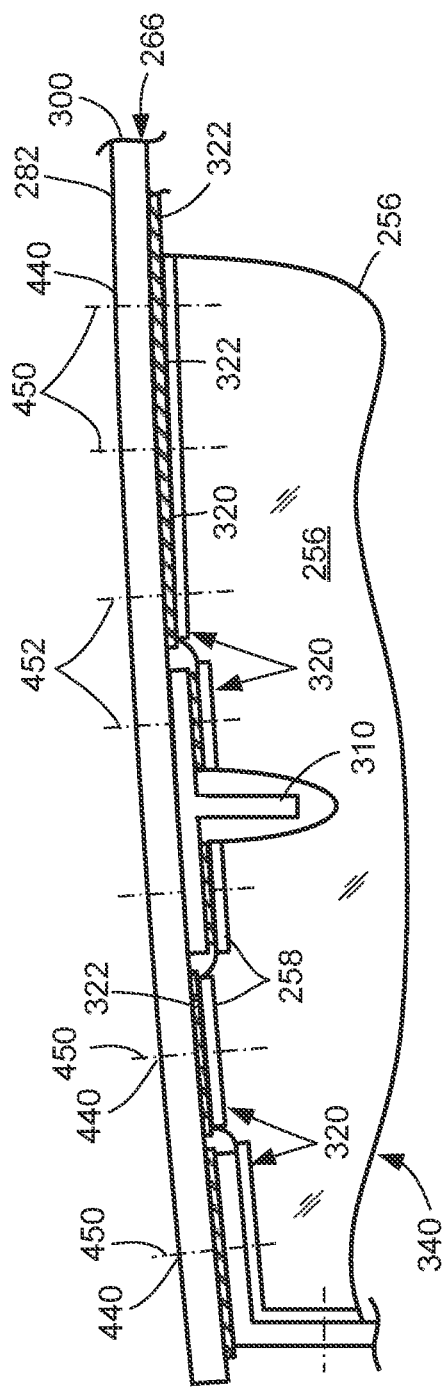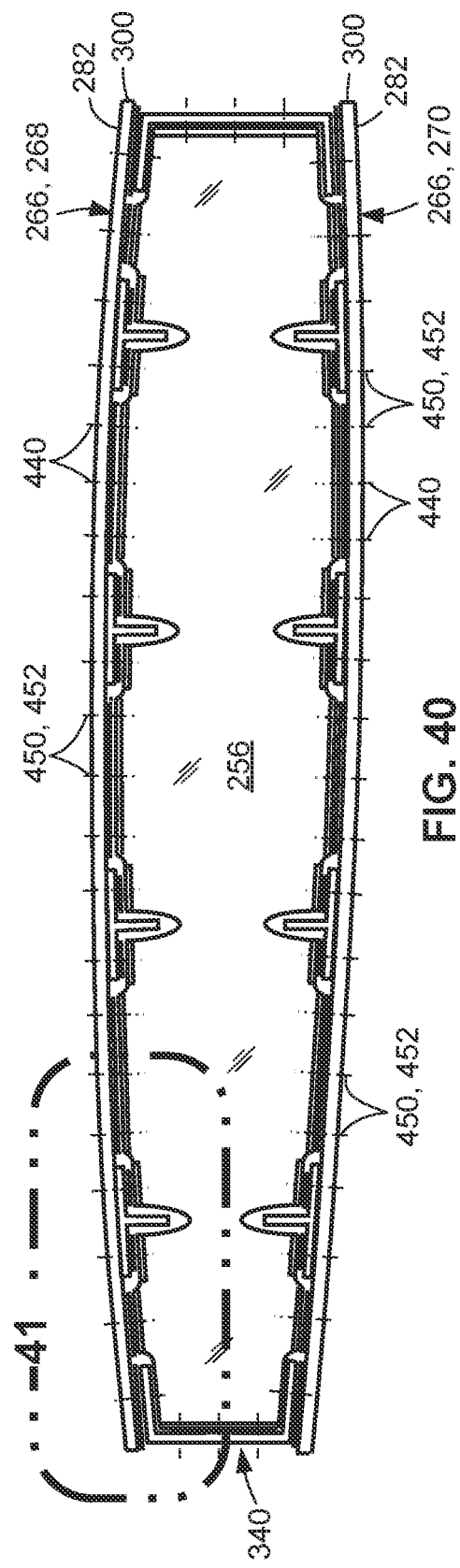

METHOD OF MANUFACTURING AN ASSEMBLY HAVING A NOMINAL THICKNESS SKIN PANEL

FIELD

The present disclosure relates generally to the manufacturing of assemblies and, more specifically, to the manufacturing of a skin panel in preparation for coupling to mating structure.

BACKGROUND

In aircraft production, skin panels are used in a variety of structural assemblies that make up the aircraft. For example, the wings of an aircraft are comprised of an upper skin panel and a lower skin panel, coupled to a front spar, a rear spar, and a plurality of ribs (i.e., the mating structure). The upper and lower skin panels typically include spanwise stiffeners (i.e., stringers) coupled to the skin inner surfaces. The skin outer surface (i.e. the outer mold line) of the upper and lower skin panels defines the aerodynamic shape or profile of the wings. The spars are the primary structural members of the wing, and the ribs transfer aerodynamic loads on the skin panels to the spars.

Various methods have been proposed for manufacturing structural assemblies such as aircraft wings. In one approach for manufacturing a wing made of composite material (e.g., carbon-fiber), the spars and ribs are assembled to form a ladder assembly, and the upper and lower skin panels are each laid up and cured on a dedicated layup mandrel. After curing, each skin panel is removed from its layup mandrel, and is machined one or more times at the interface locations where the skin panel is coupled to the ladder assembly. Each machining operation requires a time-consuming and costly machining setup. In addition, because each skin panel cannot be machined until the ladder assembly is completed, there are significant holding costs associated with the skin panels waiting to be machined, and the ladder assembly waiting for completion of the skin panels. The manufacturing approach may also result in a non-nominal aerodynamic profile of the wings after the skin panels are fastened to the ladder assembly.

Other manufacturing approaches have been proposed in attempts to increase part accuracy, and reduce the time and costs associated with producing structural assemblies. For example, one approach uses a specific holding fixture for supporting each cured skin panel during machining, trimming, and drilling. Unfortunately, the holding fixtures introduce tolerances and variations into the manufacturing process. In this regard, because the holding fixture can never hold the skin panel at the same surface profile as the layup mandrel that created the skin panel, slight variations are machined into each skin panel, which results in gaps between the skin panels and the ladder assembly. Gaps that exceed allowable tolerances require the time-consuming and costly process of manufacturing and installing individual shims. Furthermore, because the skin panel must be re-indexed to the supporting structure (e.g., the holding fixture, the ladder assembly) each time the skin panel is moved, additional tolerances are introduced.

As can be seen, there exists a need in the art for a method of manufacturing structure assemblies that avoids the drawbacks associated with the above-described manufacturing approaches.

SUMMARY

The above-noted needs associated with manufacturing panel assemblies are addressed by the present disclosure, which provides a method of manufacturing a panel assembly. The method includes supporting the panel assembly in a free state using a holding fixture in which the panel assembly has a geometric shape that is different than the geometric shape of the panel assembly in an as-designed nominal state. The panel assembly has a skin panel, and sacrificial material coupled to a skin panel inner surface respectively at interface locations for coupling the panel assembly to mating structure. The method includes acquiring a free state outer surface contour of the panel assembly by scanning a skin panel outer surface while the panel assembly is supported by the holding fixture. The method also includes developing a numerically controlled (NC) machining program having cutter paths configured for machining the interface locations to an inner surface contour that reflects nominal thicknesses of the panel assembly based off of the free state outer surface contour. In addition, the method includes machining the sacrificial material at the interface locations by moving a cutter along the cutter paths while the panel assembly is supported by the holding fixture, and while the cutter is backed by a backing device applying backing pressure against the skin panel outer surface.

Also disclosed is a method of manufacturing a panel assembly, comprising supporting a panel assembly in a free state using a holding fixture, and acquiring a free state outer surface contour of the panel assembly by scanning a skin panel outer surface of the skin panel while the panel assembly is supported by the holding fixture. The method includes developing an NC machining program having cutter paths configured for machining the interface locations to an inner surface contour that is based on the free state outer surface contour, and machining the sacrificial material by moving a cutter along the cutter paths while the panel assembly is supported by the holding fixture. The method also includes removing the panel assembly from the holding fixture, and indexing the panel assembly and the mating structure to each other, and fastening the panel assembly and the mating structure together to result in a structural assembly.

In another example, disclosed is a method of manufacturing an aerostructure of an aircraft. The method includes supporting a panel assembly of an aerostructure in a free state using a holding fixture in which the panel assembly has a geometric shape that is different than the geometric shape of the panel assembly in an as-designed nominal state. The skin panel has a skin panel outer surface configured to define an outer mold line (OML) that forms an aerodynamic contour of the aerostructure. The method further includes acquiring a free state outer surface contour of the skin panel by scanning the skin panel outer surface while the panel assembly is supported by the holding fixture in the free state, and developing an NC machining program having cutter paths configured for machining the interface locations to an inner surface contour that reflects nominal thicknesses of the panel assembly based on the free state outer surface contour. The method also includes machining the sacrificial material by moving a cutter along the cutter paths while the panel assembly is supported by the holding fixture, and while the cutter is backed by a backing device applying backing pressure against the skin panel outer surface The features, functions, and advantages that have been discussed can be achieved independently in various versions of the disclosure or may be combined in yet other versions, further details of which can be seen with reference to the following description and drawings.

BRIEF DESCRIPTION OF THE DRAWINGS

The disclosure can be better understood with reference to the following detailed description taken in conjunction with the accompanying drawings, which illustrate preferred and exemplary versions, but which are not necessarily drawn to scale. The drawings are examples and not meant as limitations on the description or the claims.

FIG. 4 is a sectional view taken along line 4-4 of FIG. 3, and illustrating an example of a structural assembly in the form of a wing, comprised of an upper panel assembly and a lower panel assembly each in the as-design or nominal state, and shown coupled to a front spar, a rear spar, and a rib of the wing;

FIG. 5 is an enlarged view of the portion of the wing identified by reference numeral 5 of FIG. 4, and illustrating the upper panel assembly and the lower panel assembly, each comprised of a skin panel and structural elements in the form of stringers coupled to the skin panel inner surface;

FIG. 6 is a sectional view taken along line 6-6 of FIG. 5, and illustrating an example of a rib having rib flanges coupled to the skin panel respectively of the upper panel assembly and lower panel assembly;

FIG. 7 is a sectional view taken along line 7-7 of FIG. 5, and illustrating an example of the rib coupled to a stringer of the skin panel respectively of the upper panel assembly and lower panel assembly;

FIG. 12 is a partially exploded perspective view of the portion of the panel assembly of FIG. 11, further illustrating sacrificial material for application onto the interface locations of the panel assembly;

FIG. 13 is an enlarged view of the portion of the panel assembly of FIG. 12, showing the sacrificial material on the interface locations;

FIG. 14 is a sectional view taken along line 14-14 of FIG. 13, and illustrating the sacrificial material on the skin panel inner surface and on the structural elements (e.g., on the stringer flanges);

FIG. 15 is an exploded view of an example of a panel assembly comprised of a composite skin panel and composite structural elements prior to being laid up on a layup mandrel;

FIG. 16 shows the composite skin panel and structural elements of FIG. 15 laid up on the layup mandrel, and covered by a vacuum bag during the application of vacuum pressure and heat for curing the panel assembly while the skin panel is in the nominal state against the contour of the layup mandrel;

FIG. 17 shows the composite panel assembly after curing, and illustrating the effects of springback of the skin panel, causing the panel assembly to change shape from the nominal state of FIG. 16;

FIG. 20 is a side view taken along line 20-20 of FIG. 19, and illustrating an example of a robotic device moving the scanning device along the skin panel outer surface for acquiring the outer surface contour of the panel assembly in the free state;

FIG. 21 is a top-down perspective view of an example of a scanning device acquiring the outer surface contour of the skin panel outer surface;

FIG. 29 is a sectional view of an example of the cutter moving along the NC machining program, and machining into the skin panel in order to achieve the nominal thickness defined for that interface location;

FIG. 30 is a sectional view of an example of the sacrificial material at an interface location machined in a manner resulting in a linear tapered offset from the skin panel outer surface;

FIG. 40 shows the upper and lower panel assembly after fastening to the front spar, the rear spar, and the ribs, causing the geometric shape of the upper and lower panel assembly to transition from the free state to the nominal state;

FIG. 41 is an enlarged view of an aft upper portion of the wing identified by reference numeral 41 of FIG. 40, and illustrating the sacrificial material at each of the interface locations between the upper panel assembly and the wing rib and rear spar;

The figures shown in this disclosure represent various aspects of the versions presented, and only differences will be discussed in detail.

DETAILED DESCRIPTION

Disclosed versions will now be described more fully hereinafter with reference to the accompanying drawings, in which some, but not all of the disclosed versions are shown. Indeed, several different versions may be provided and should not be construed as limited to the versions set forth herein. Rather, these versions are provided so that this disclosure will be thorough and fully convey the scope of the disclosure to those skilled in the art.

This specification includes references to "one version" or "a version." Instances of the phrases "one version" or "a version" do not necessarily refer to the same version. Similarly, this specification includes references to "one example" or "an example." Instances of the phrases "one example" or "an example" do not necessarily refer to the same example. Particular features, structures, or characteristics may be combined in any suitable manner consistent with this disclosure.

As used herein, "comprising" is an open-ended term, and as used in the claims, this term does not foreclose additional structures or steps.

As used herein, "configured to" means various parts or components may be described or claimed as "configured to" perform a task or tasks. In such contexts, "configured to" is used to connote structure by indicating that the parts or components include structure that performs those task or tasks during operation. As such, the parts or components can be said to be configured to perform the task even when the specified part or component is not currently operational (e.g., is not on).

As used herein, an element or step recited in the singular and preceded by the word "a" or "an" should be understood as not necessarily excluding the plural of the elements or steps.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

Figure 1:
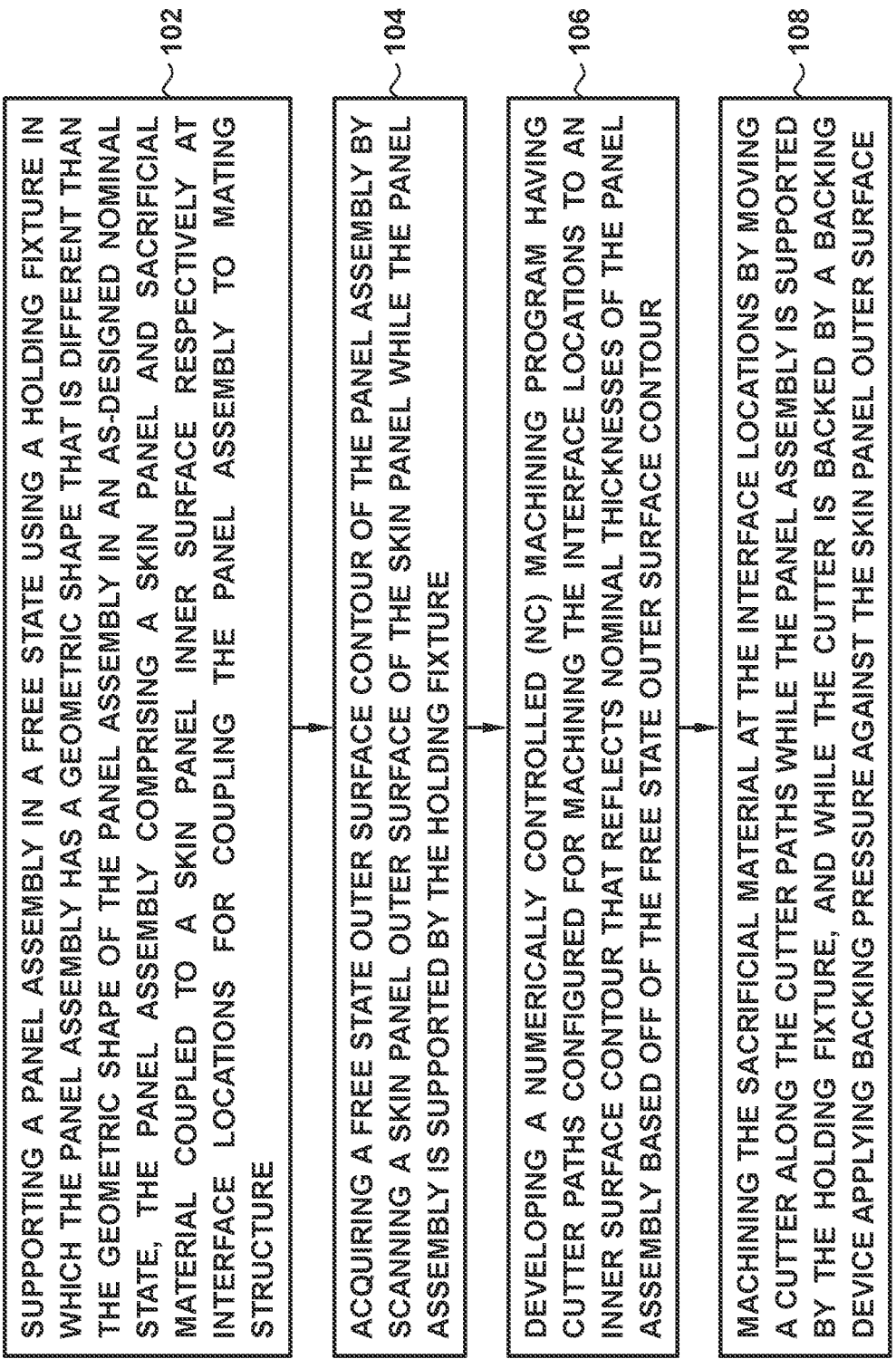
FIG. 1 is a flowchart of operations included in a method of manufacturing a panel assembly.
Figure 8:
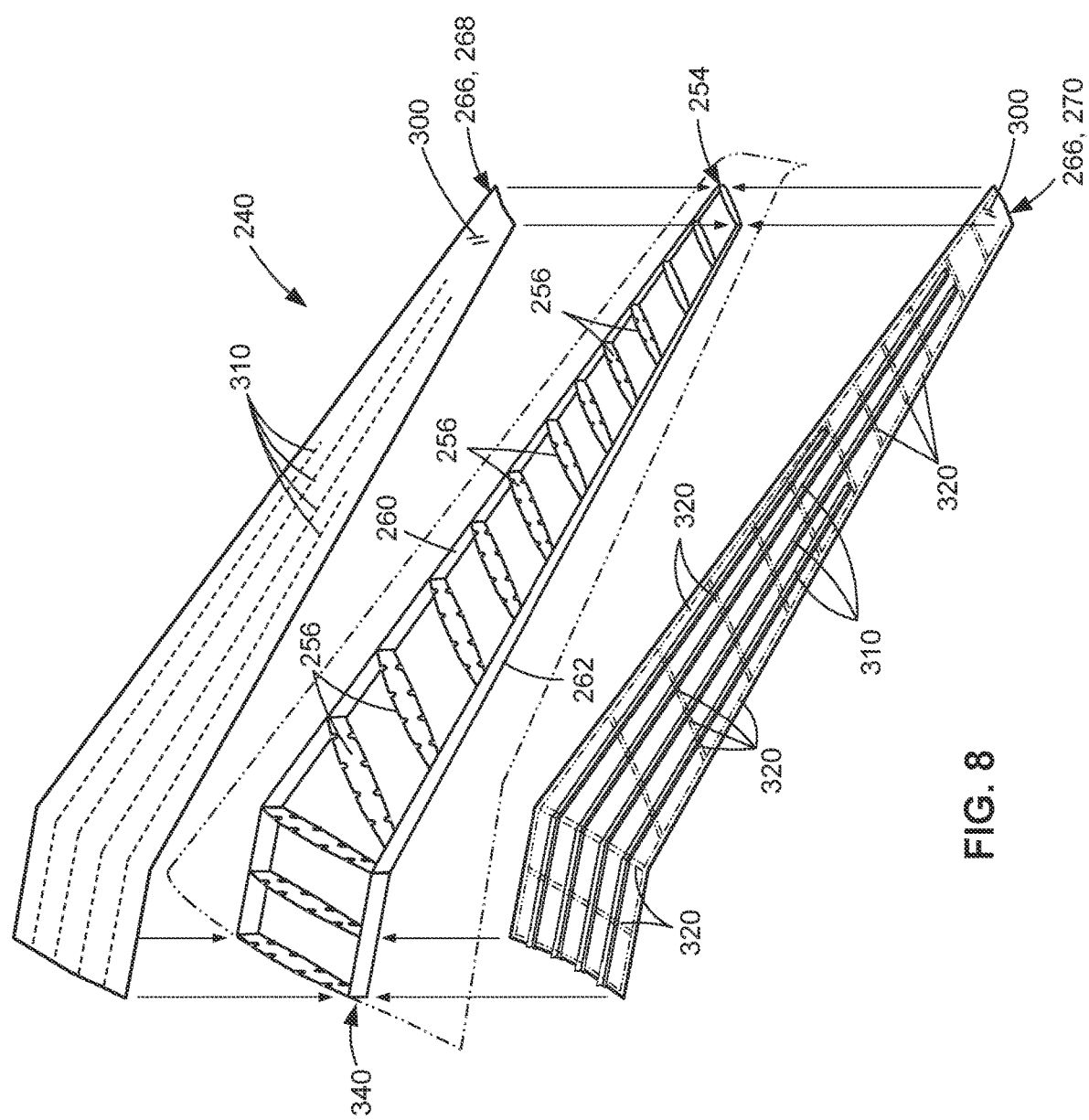
FIG. 8 is an exploded perspective view of an example of the wing of FIG. 3.

Referring now to the drawings which illustrate various examples of the disclosure, shown in FIG. 1 is a flowchart of a method 100 of manufacturing a panel assembly 266 (FIG. 12). The panel assembly 266 includes a skin panel 300 (FIG. 12), and sacrificial material 322 (FIG. 12) applied to or integrated with the skin panel 300 at a plurality of discrete interface locations 320 where the panel assembly 266 is attached to mating structure 340 (FIG. 8). As described in greater detail below, the sacrificial material 322 is machined in a manner resulting in the panel assembly 266 having nominal thicknesses 306 (FIGS. 24-25) at each interface location 320, thereby reducing or eliminating the need for shimming gaps that may otherwise occur at the interface locations 320 when the panel assembly 266 is attached to mating structure 340.

Figure 9:
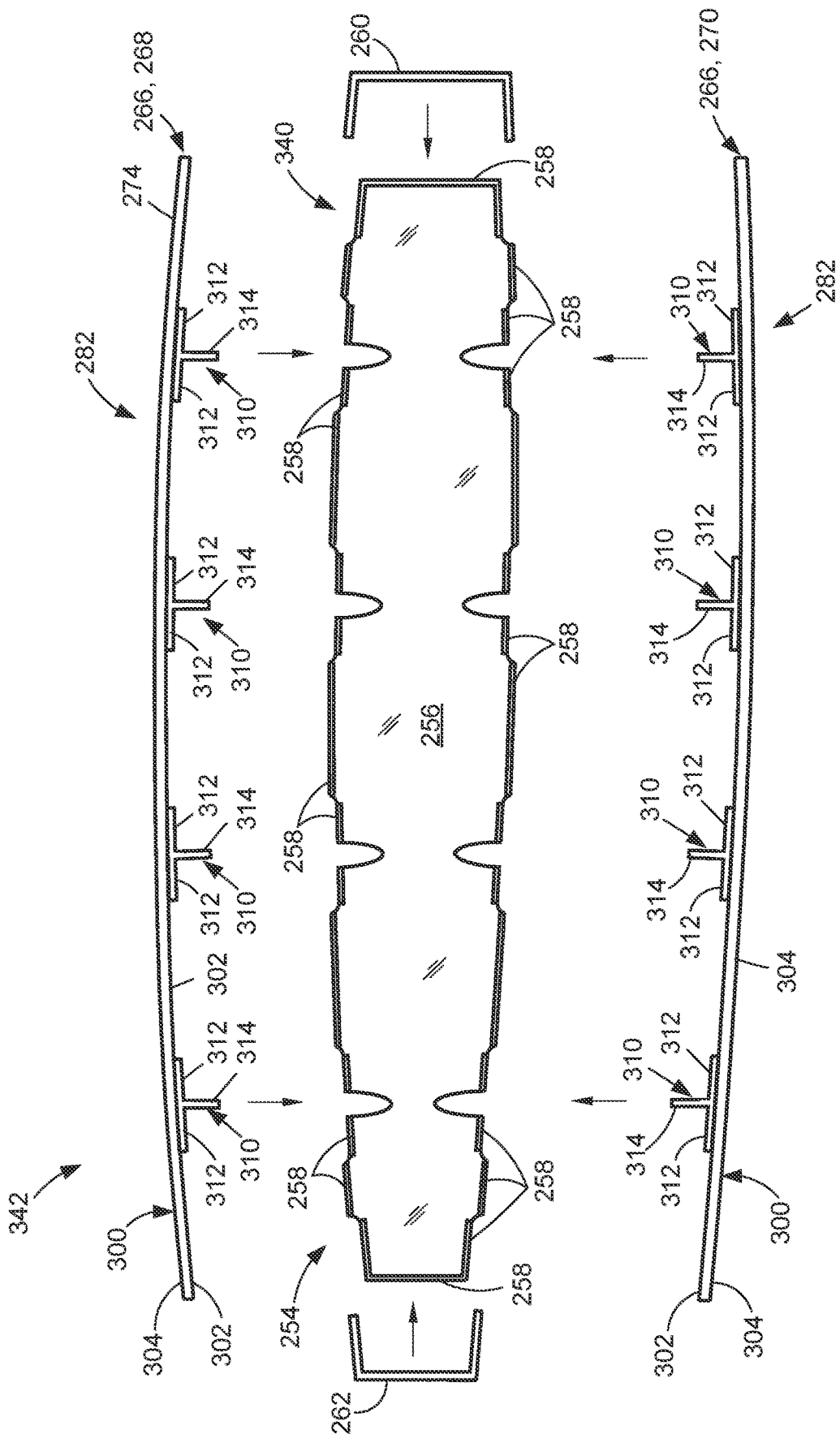
FIG. 9 is an exploded sectional view of the wing of FIG. 8.

The skin panel 300 (FIG. 9) has a skin panel outer surface 304 (FIG. 9) and a skin panel inner surface 302 (FIG. 9). In some examples, the panel assembly 266 includes skin stiffeners 310 (FIG. 9) extending along a spanwise direction of the skin panel 300. The skin stiffeners 310 each have one or more stiffener flanges 312 (FIG. 9), and a stiffener web 314 (FIG. 9) extending outwardly from the stiffener flanges 312. The stiffener flanges 312 are coupled to the skin panel inner surface 302. The panel assembly 266 has a panel assembly outer surface 274 (FIG. 9) and a panel assembly inner surface 272 (FIG. 9). The panel assembly outer surface 274 comprises (i.e., is defined by) the skin panel outer surface 304. The panel assembly inner surface 272 is defined by the skin panel inner surface 302 and the exposed surfaces of the stiffener flanges 312.

Figure 2:
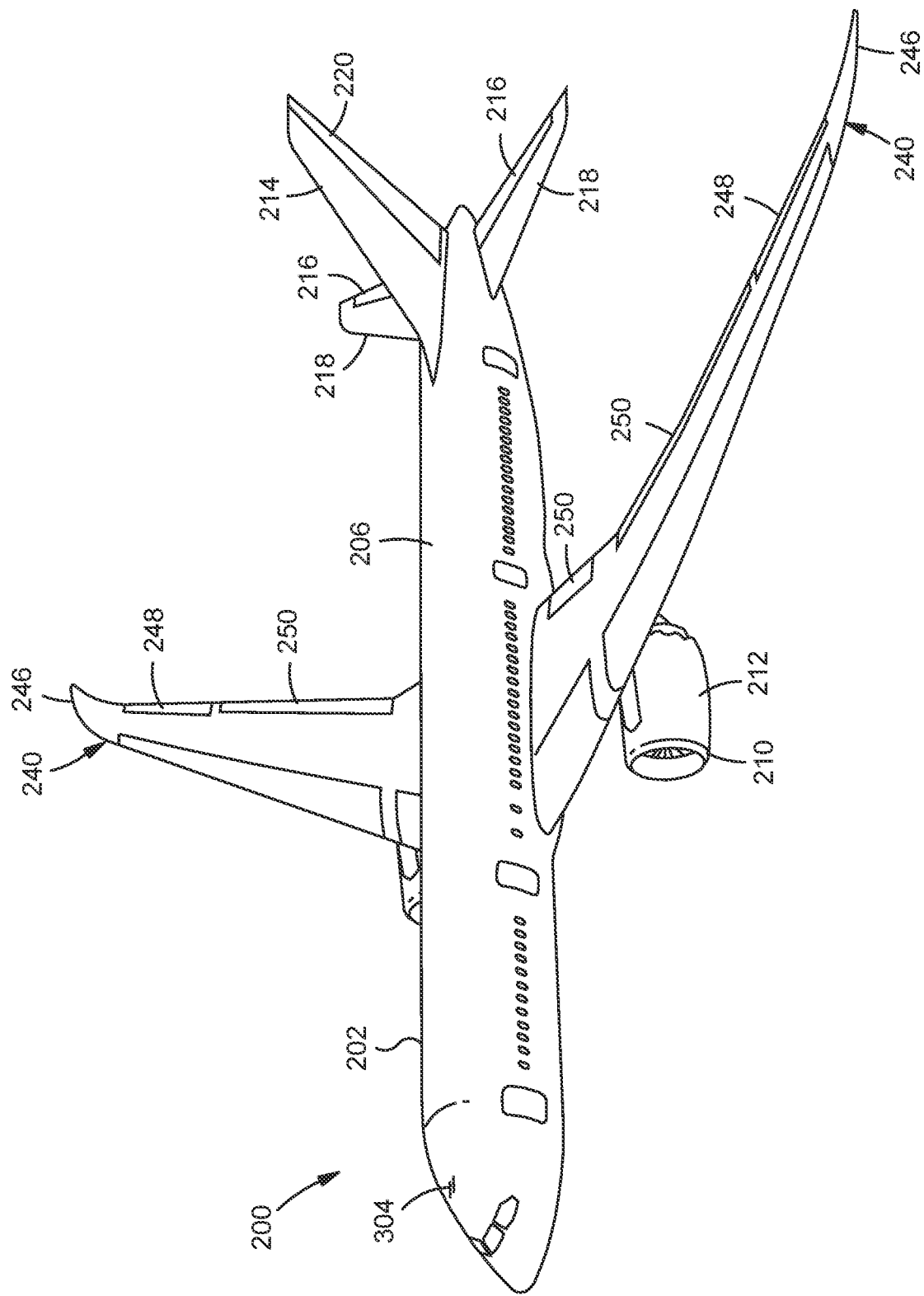
FIG. 2 is a perspective view of an example of an aircraft for which the method may be implemented for manufacturing panel assemblies for one or more aerostructures of the aircraft.

As mentioned above, the method 100 include mating the panel assembly 266 (FIG. 9) to mating structure 340 (FIG. 9), to thereby result in a structural assembly 342. Shown in FIGS. 2-41 are illustrations of the implementation of the method 100 in manufacturing a structural assembly 342 configured as a wing 240 of an aircraft 200 (FIG. 2). However, the presently-disclosed method 100 may be implemented for manufacturing other types of structural assemblies 342, and is not limited to manufacturing a wing 240. For example, FIG. 2 illustrates an aircraft 200 comprised of various structural assemblies 342, which are described herein as aerostructures 202. In the present disclosure, an aerostructure 202 is one in which the skin panel outer surface 304 defines the aerodynamic contour of at least a portion of the aircraft 200. In this regard, the skin panel outer surface 304 defines the outer mold line (OML) for air flowing over the aerostructure 202 when the aircraft 200 is in operation, such as during flight.

Referring to FIG. 2, the aircraft 200 includes other types of aerostructures 202 that may be manufactured using the presently-disclosed method 100. Such aerostructures 202 include ailerons 248, flaps 250, and/or wingtip devices 246, such as winglets. Other aerostructures 202 include horizontal stabilizers 218, elevators 216, vertical stabilizers 214, rudders 220, fuselage panels 206, engine nacelles 210, engine cowlings 212, and any one of a variety of other types of aerostructures 202 that are part of an aircraft 200. However, the method 100 may be implemented for manufacturing any type of structure, substructure, assembly, or subassembly, without limitation. In addition, the method 100 may be implemented for manufacturing structural assemblies 342 for any type of application, and is not limited to aircraft production. In this regard, the method 100 may be implemented for manufacturing any type of movable or non-movable structure. Examples of movable structures include, but are not limited to, any type of land-based vehicle, any type of air vehicle including fixed-wing aircraft (e.g., FIG. 2) and rotary wing aircraft, any type of space vehicle, and any type of marine vessel. Examples of non-movable structures include, but are not limited to, buildings, architectural objects, utility structures such as wind turbines (e.g., turbine blades), and other types of generally non-movable objects.

Shown in FIGS. 3-11 is an example of a wing 240, which has a wing root 242 extending to a wingtip 244. The wing 240 includes leading edge devices 252, such as slats or leading edge flaps. The trailing edge includes the above-mentioned trailing edge devices, such as ailerons 248 and trailing edge flaps 250. Referring to FIGS. 3-9, the wing 240 has upper and lower skin panels 300, each of which is coupled to internal structural components 254 (i.e., the mating structure 340). In the present example, the internal structural components 254 of the wing 240 include a front spar 260, a rear spar 262, and a plurality of ribs 256. In the example shown, the upper and lower skin panels 300 include spanwise skin stiffeners 310 (i.e., stringers). The outer surfaces of the upper and lower skin panels 300 serve as the outer mold line (OML) of the wings 240, and define the aerodynamic shape of the wings 240. During flight, the ribs 256 transfer aerodynamic loads on the skin panels 300 into the front spar 260 and the rear spar 262, which are the primary load-carrying members of the wing 240.

Figure 3:
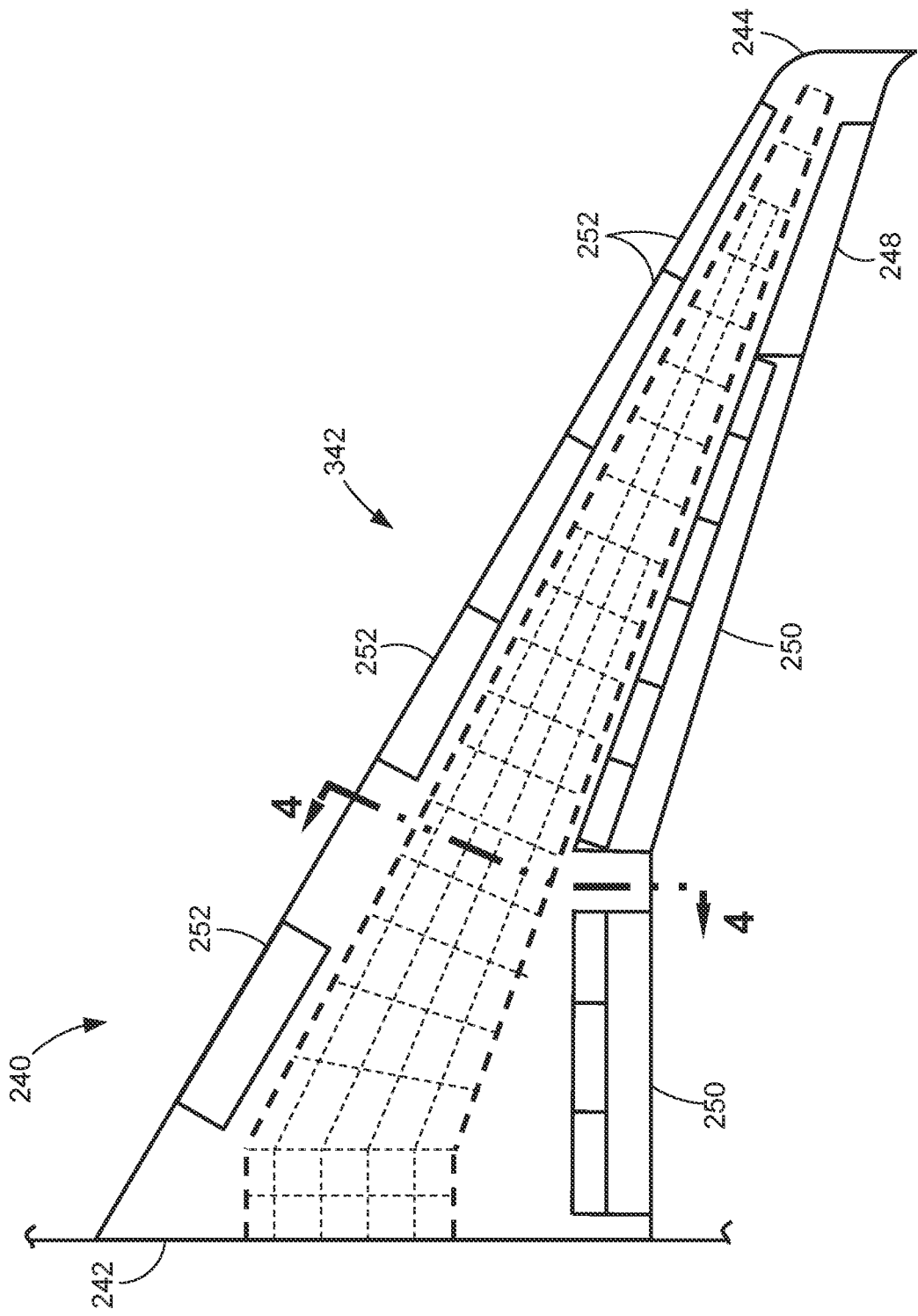
FIG. 3 is a plan view of an example of a wing of the aircraft.

Referring to FIGS. 4-9, shown in FIGS. 4-5 are cross-sectional views of the wing 240 of FIG. 3, showing the skin stiffeners 310 coupled to the inner surfaces of the upper and lower skin panels 300. As mentioned above, each skin stiffener 310 is comprised of stiffener flanges 312 and a stiffener web 314. The stiffener flanges 312 are coupled to the skin panel inner surfaces 302 in a manner described below.

Also shown in FIGS. 4-5 are the front spar 260, the rear spar 262, and the ribs 256. Each rib 256 includes mouse holes to allow the stiffener webs 314 to pass through the rib 256. The forward and aft end of each rib 256 includes rib flanges 258 for coupling the rib 256 respectively to the front spar 260 and the rear spar 262, via mechanical fasteners 452. In addition, the top and bottom side of each rib 256 has a series of rib flanges 258 (e.g., rib shear ties) for directly or indirectly coupling the rib 256 to the skin panels 300 on the upper and lower sides of the wing 240. For example, as shown in FIG. 6, the interface location 320 for some of the rib flanges 258 is on the skin panel inner surface 302 of the skin panels 300. As shown in FIG. 7, the interface location 320 for other rib flanges 258 of the same rib 256 is on the stiffener flanges 312. At each interface location 320, mechanical fasteners 452 are installed for fastening the skin panels 300 to the ribs 256. Mechanical fasteners 452 are also used for fastening the skin panels 300 to the spar flanges 264.

Figure 10:
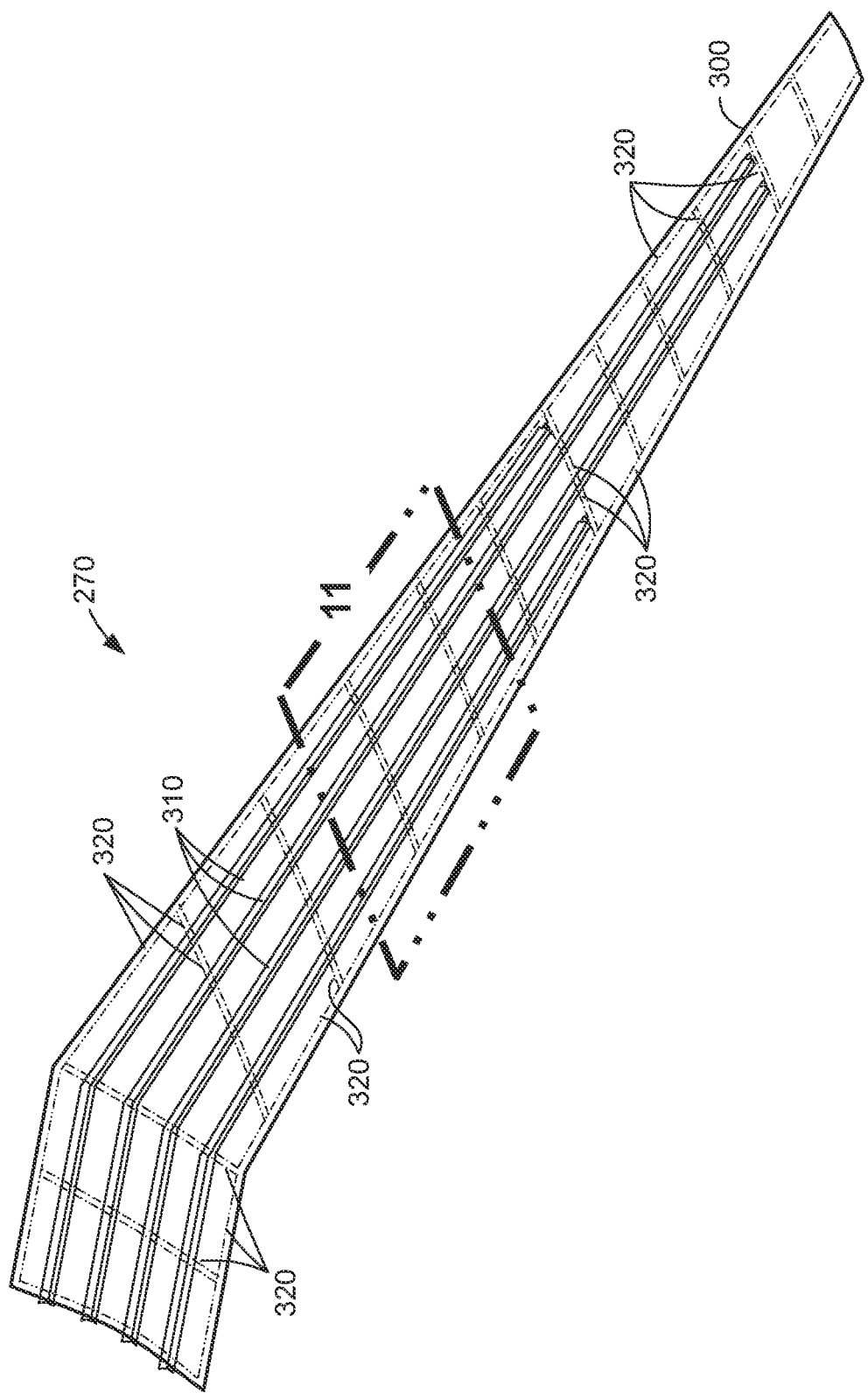
FIG. 10 is a perspective view of an example of the lower panel assembly of the wing of FIG. 8.
Figure 11:
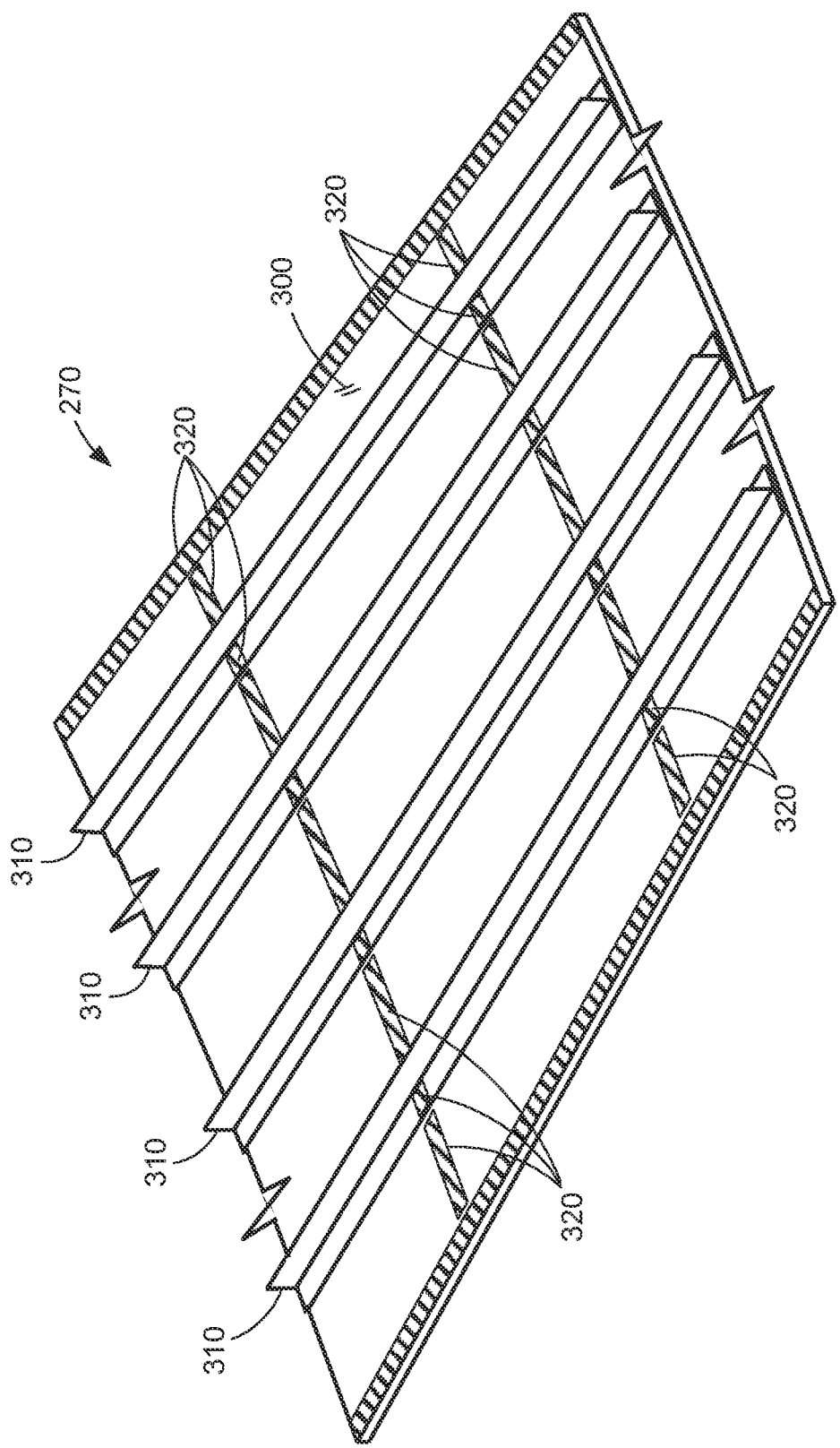
FIG. 11 is an enlarged view of the portion of the lower panel assembly identified by reference numeral 11 of FIG. 10, and illustrating interface locations on the panel assembly inner surface where the front spar, the rear spar, and the ribs are coupled to the skin panel.

FIGS. 8-9 are exploded views of the wing 240 showing an upper panel assembly 268, a lower panel assembly 270, and the internal structural components 254, comprising the front spar 260, the rear spar 262, and the ribs 256. In FIG. 8, shown are the interface locations 320 on the lower panel assembly 270 where the skin panel 300 is attached to the front spar 260, the rear spar 262, and the ribs 256. FIG. 9 shows the upper and lower panel assembly 268, 270 in a nominal state 282 prior to attachment to the front spar 260, rear spar 262 and ribs 256. When the upper and lower panel assembly 268, 270 are in the nominal state 282 and are attached to the internal structural components 254 at the interface locations 320 (e.g., FIG. 5), the skin panels 300 have an as-designed geometric shape, and each skin panel outer surface 304 has an as-designed nominal outer surface contour. FIGS. 10-11 show the lower panel assembly 270, and the interface locations 320 where the lower panel assembly 270 is attached to the front spar 260, the rear spar 262, and the ribs 256.

Referring now to FIGS. 12-14, shown in FIG. 12 is a partially exploded view of a portion of the lower panel assembly 270, illustrating sacrificial material 322 for application or integration at each interface location 320 on the skin panel inner surface 302 and on the stiffener flanges 312. FIG. 13 is a magnified view of a portion of the lower panel assembly 270 showing an example of the sacrificial material 322 applied to the interface locations 320 on the skin panel inner surface 302 and on the stiffener flanges 312. FIG. 14 is a sectional view of the lower panel assembly 270 showing the sacrificial material 322 at the interface locations 320.

As described in greater detail below, the sacrificial material 322 is applied to, or integrated with, the panel assembly 266 at each interface location 320. The sacrificial material 322 provides a means for manufacturing a structural assembly 342 such that the skin panel 300 has highly accurate thicknesses (i.e., nominal thicknesses 306—FIGS. 24-25) at the interface locations 320. Advantageously, by manufacturing the structural assembly 342 such that the skin panel 300 has nominal thicknesses 306 at the interface locations 320, the need to install shims between the skin panel 300 and the mating structure 340 is reduced or eliminated, as described in greater detail below.

Referring to FIGS. 15-17, the method 100 will now be described in the context of manufacturing a panel assembly 266 of a wing 240 formed of composite material. The panel assembly 266 is an upper panel assembly 268 (FIG. 8) or a lower panel assembly 270 (FIG. 8) of a wing 240. However, as mentioned above, the method 100 is applicable for manufacturing structural assemblies 342 any one of a variety of different types of panel assemblies 266 formed of any type of material, including any type of metallic material and/or any type of non-metallic material.

In manufacturing a composite wing 240, the method 100 includes laying up a composite skin panel 300 on a mandrel surface 502 of a layup mandrel 500. The mandrel surface 502 is shaped to the as-designed contour of the skin panel outer surface 304. Each skin panel 300 is laid up by sequentially laying up individual plies (not shown) of composite material on the layup mandrel 500. The composite material may be a fiber-reinforced polymer matrix material. In one example, the composite material is a prepreg material comprised of unidirectional reinforcing fibers pre-impregnated with resin. The reinforcing fibers may be formed of any one of a variety of materials, such as plastic, glass, ceramic, carbon, metal, or any combination thereof. The resin is a thermosetting resin or a thermoplastic resin, and may be formed of any one of a variety of organic or inorganic materials. In one example, the composite material is carbon-fiber-reinforced plastic (CFRP) prepreg.

The skin stiffeners 310 (i.e., stringers) may be laid up separate from the laying up of the skin panel 300, and may be formed of the same material or a different material than the skin panel 300. In one example, the skin stiffeners 310 are laid up using plies of carbon-fiber-reinforced plastic (CFRP) prepreg, or other material that is compatible with the material of the skin panel 300. The skin stiffeners 310 may be coupled to the skin panel 300 via co-curing or co-bonding to the skin panel inner surface 302, or by secondarily bonding to the skin panel 300 (after curing).

The method 100 includes applying sacrificial material 322 (FIGS. 12-14) to the interface locations 320 on the panel assembly inner surface 272, as described in greater detail below. As mentioned above, the interface locations 320 comprise locations where the panel assembly 266 (after curing) is to be attached to mating structure 340. The sacrificial material 322 at each interface location 320 preferably has a footprint (e.g., a length and a width) that is approximately (e.g., within 10 percent) the same size as the footprint of the interface location 320 of the mating structure 340 to be attached to the panel assembly 266 at that interface location 320. For example, the footprint of the sacrificial material 322 at an interface location 320 where a rib flange 258 (FIG. 6) mates to the skin panel 300 is preferably the same size as the footprint of the rib flange 258. Similarly, the footprint of the sacrificial material 322 at an interface location 320 where a rib flange 258 attaches to a stiffener flange 312 (FIG. 7) is preferably the same size as the footprint of the rib flange 258 at that location. Likewise, the footprint of the sacrificial material 322 at an interface location 320 where a spar flange 264 (FIG. 5) mates to the skin panel 300 is preferably the same size as the footprint of the spar flange 264 at that location. Alternatively, the sacrificial material 322 at each interface location 320 preferably has a footprint that is no smaller than the footprint of the interface location 320 of the mating structure 340 at that interface location 320.

The sacrificial material 322 is applied at each interface location 320 in a thickness such that, after machining (as described below), the skin panel 300 has nominal thicknesses 306 (FIGS. 24-25) at each interface location 320. In addition, the sacrificial material 322 is applied at each interface location 320 in a thickness that, prior to machining, results in the combined thickness of the skin panel 300 and the sacrificial material 322 being greater than the maximum thickness tolerance at that interface location 320. In one example, the sacrificial material 322 is applied in a pre-machined thickness of no less than 0.12 inch at each interface location 320, in a manner described below. However, the sacrificial material 322 may be applied in any pre-machined thickness, and is not limited to a pre-machined thickness of no less than 0.12 inch.

The sacrificial material 322 may be formed of any material, and preferably sacrificial material 322 that is easily machinable (e.g., aluminum, fiberglass, etc.). In addition, the sacrificial material 322 is preferably mechanically and chemically stable during manufacturing, and when exposed to the service environment of the panel assembly 266. For example, the sacrificial material 322 is preferably non-compressible or non-deformable by more than 10 percent (i.e., in the thickness direction) when in service. Furthermore, the sacrificial material 322 preferably has a melting temp that is below the service temperature of the panel assembly 266. In addition, the sacrificial material 322 is preferably non-outgassing in the service environment of the panel assembly 266, and/or is non-dissolvable when exposed to the elements. Other preferable mechanical properties include a coefficient of thermal expansion (CTE) that is approximately (e.g., ±20 percent) of the CTE of the material of the panel assembly 266, at least within the service temperature range of the panel assembly 266.

Examples of the sacrificial material 322 include, but are not limited to, fiber-reinforced polymer matrix material (i.e., composite material) such as fiberglass or CFRP. Other examples include non-fibrous polymeric material, such as epoxy or moldable plastic. In another example, the sacrificial material 322 may comprise non-polymeric material, or metallic material (e.g., aluminum). Still other examples include fiber metal laminate, including GLARE™, described as glass-aluminum-reinforced epoxy. The sacrificial material 322 for each interface location 320 may be separately manufactured, and/or co-cured, co-bonded, or secondarily bonded to each interface location 320.

In one example, the sacrificial material 322 may be applied by sequentially laying up a localized stack of plies (not shown) of fiber-reinforced polymer matrix material at each of the interface location 320. The fiber-reinforced polymer matrix material may be a fiberglass material, a carbon-fiber-reinforced polymeric material, or other material. The method 100 may include laying up additional, localized plies of the same material (e.g., CFRP) as the skin panel 300, or laying up localized plies of a different material than the skin panel 300. In another example, the method 100 may include separately laying up the sacrificial material 322 for each interface location 320, and then installing the uncured sacrificial material 322 at the interface locations 320, followed by co-curing or co-bonding with the panel assembly 266 (i.e., the skin panel 300 and the skin stiffeners 310), using the arrangement shown in FIGS. 15-16. Alternatively, the method 100 may include separately laying up and pre-curing the sacrificial material 322 for each interface location 320, and then secondarily bonding the sacrificial material 322 to the cured panel assembly 266.

Referring to FIGS. 15-16, after laying up the skin panel 300 and locating the skin stiffeners 310 on the skin panel inner surface 302, a vacuum bag 504 and other processing layers (e.g., breather fabric, release film, etc.) are applied over the layup components, and the side edges of the vacuum bag 504 are sealed to the layup mandrel 500 using a bag sealant 506. Vacuum pressure is applied to the interior of the vacuum bag 504 via a vacuum source 508. The application of vacuum pressure results in compaction pressure 510 on the skin panel 300. Heat 512 is applied to initiate and/or promote the curing of the composite material of the skin panel 300 and/or skin stiffeners 310. During layup and curing, the skin panel outer surface 304 assumes the contour of the mandrel surface 502.

Referring to FIG. 17, shown is an example of the panel assembly 266 after curing is complete, and after the vacuum bag 504 and other layup components have been removed. As can be seen, the post-cured panel assembly 266 exhibits springback 514, in which the panel assembly 266 assumes a geometric shape that is different than the geometric shape of the panel assembly 266 in the nominal state 282, shown in phantom lines. In FIG. 17, the springback 514 manifests as a decrease in the radius of curvature of the skin panel 300, relative to the radius of curvature of the skin panel 300 in the nominal state 282. Springback 514 occurs after curing, when the panel assembly 266 is released from forces (i.e., compaction pressure 510) that hold the panel assembly 266 against the layup mandrel 500. Springback 514 occurs primarily as a result of a mismatch in the CTE of the resin relative to the CTE of the reinforcing fibers of the composite material. In the case of a metallic panel assembly (not shown), springback 514 may occur when the metallic panel assembly is released from forming forces (e.g., brake-forming, hydroforming, etc.), causing the metallic panel assembly 266 to take on a geometric shape that is different than the geometric shape of the metallic panel assembly 266 in the nominal state.

It should be noted that, in addition to springback, other forces may cause the panel assembly 266 in the free state 280 to assume a geometric shape that is different than the geometric shape of the panel assembly 266 in the nominal state 282. For example, changes in the orientation of the panel assembly 266 and/or the manner in which the panel assembly 266 is supported (e.g., fixturing) may cause the panel assembly 266 to assume a geometric shape that is different than the geometric shape of the panel assembly 266 in the nominal state 282 due to gravity and/or locally applied loads. It should also be noted that although the panel assembly 266 in the present example is configured such that the skin panel outer surface 304 has a convex shape, in other examples not shown, the presently-disclosed method 100 may be implemented for a panel assembly 266 in which the skin panel outer surface 304 has a concave shape, or any other shape, including any simply curved shape or any complexly curved shape.

Figure 18:
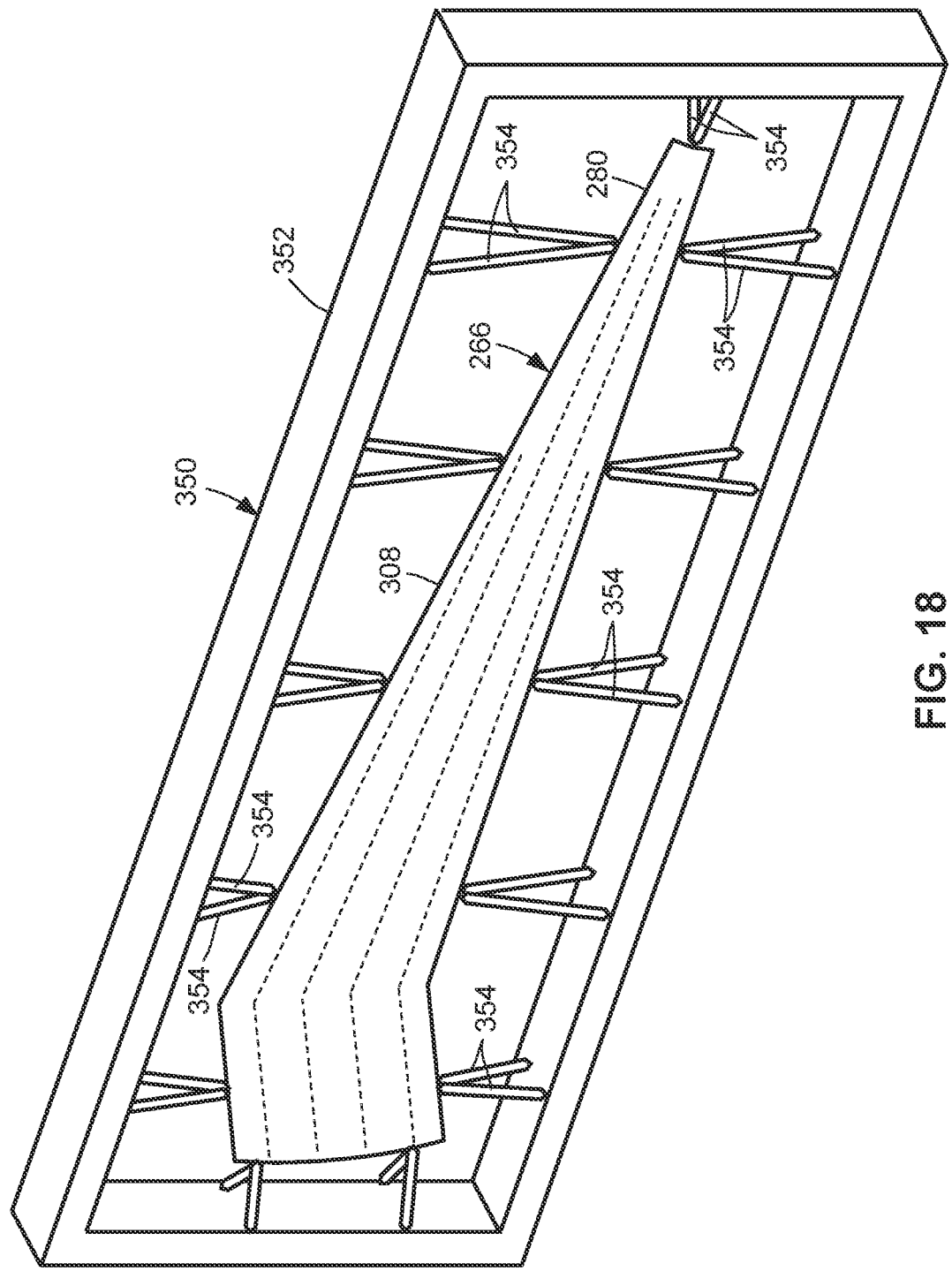
FIG. 18 is a perspective view of an example of the panel assembly supported in a free state by a holding fixture.

Referring to FIG. 18, after initially forming the panel assembly 266, step 102 of the method 100 (FIG. 1) includes supporting the panel assembly 266 in a free state 280 using a holding fixture 350 in which the panel assembly 266 is supported in a geometric shape that is different than the geometric shape of the panel assembly 266 in the nominal state 282 (e.g., shown in phantom in FIG. 17). When the panel assembly 266 is in the nominal state 282, the skin panel outer surface 304 has a nominal outer surface contour.

In FIG. 18, the holding fixture 350 is configured as an orthogonally-shaped picture frame tool 352, comprised of a pair of horizontally-oriented beams interconnected on opposite ends by a pair of vertically-oriented beams. In this example, step 102 comprises supporting the panel assembly 266 at attachment locations along the perimeter edges 308. The picture frame tool 352 has a plurality of support arms 354 located at spaced intervals along the beams. The panel assembly 266 is supported by at least two support arms 354 at each attachment location. Each support arm 354 is telescopically adjustable in length to allow the holding fixture 350 to adapt to panel assemblies 266 of different sizes and/or shapes. Once adjusted, the length of each telescopically adjustable support arm 354 is locked.

After the panel assembly 266 is loaded into the holding fixture 350, the holding fixture 350 may be rotated from a horizontal orientation (e.g., FIG. 10) to the vertical orientation shown in FIG. 18, to facilitate further processing (e.g., scanning, machining, drilling, trimming, etc.) of the panel assembly 266 in the manner described below. Although shown and described as a picture frame tool 352 having support arms 354, the holding fixture 350 may be provided in any one of a variety of sizes, shapes, and configurations, and is not limited to a picture frame tool 352 for supporting a panel assembly 266 of a wing 240.

Figure 19:
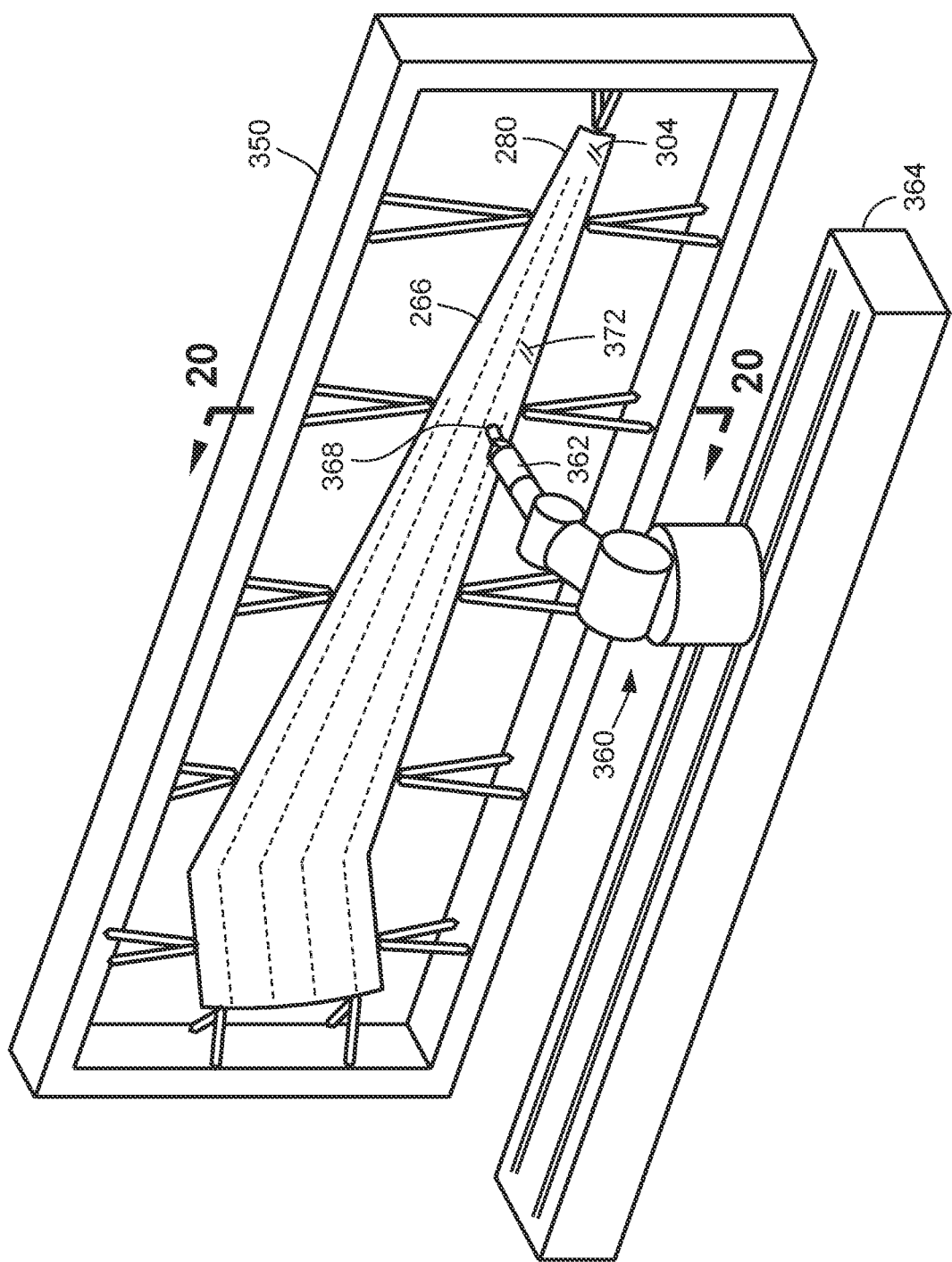
FIG. 19 shows the panel assembly during scanning by a scanning device for acquiring the outer surface contour of the skin panel outer surface while the panel assembly is in the free state while supported the holding fixture.
Figure 22:
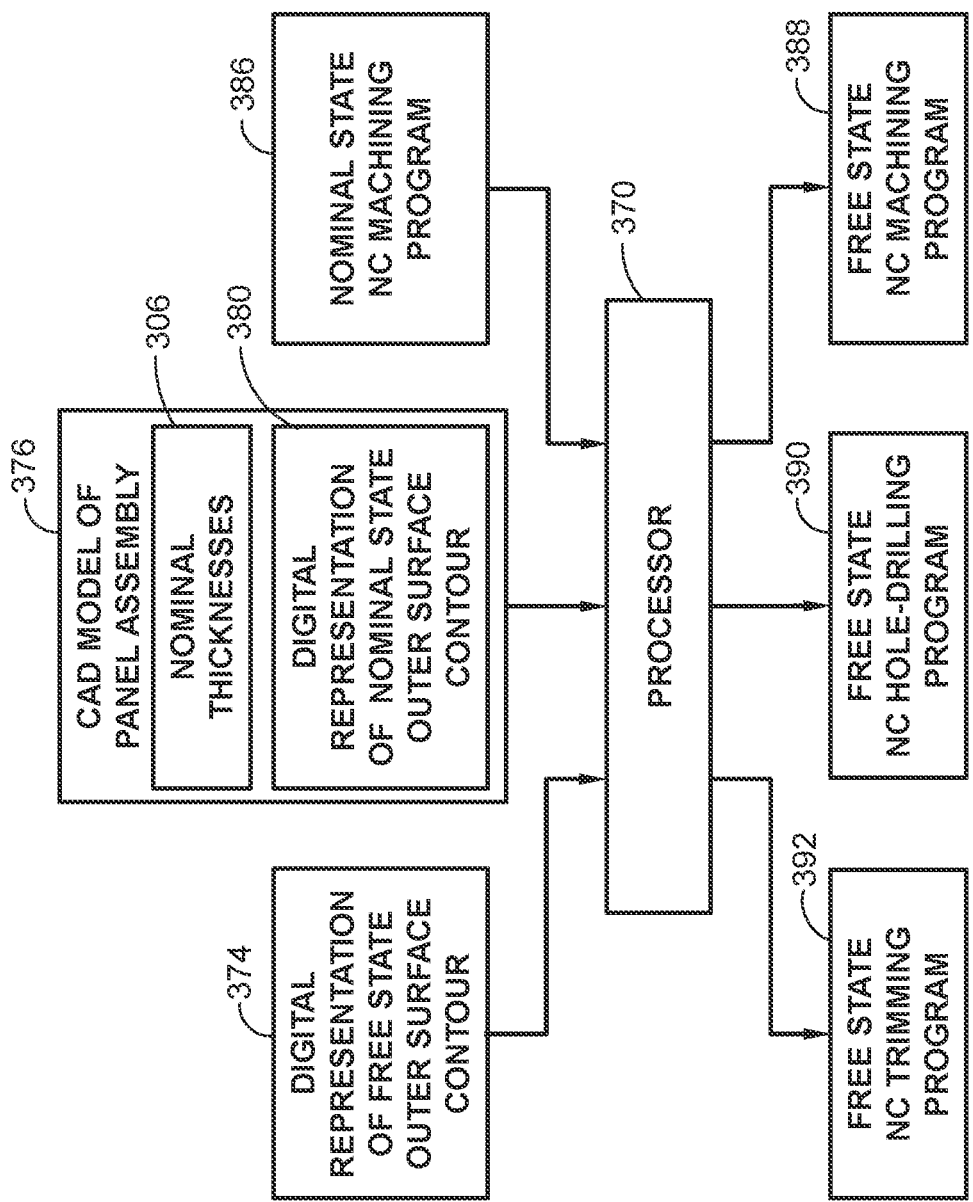
FIG. 22 is a diagram showing a processor receiving a digital representation of the free state outer surface contour of the panel assembly, for comparison to a digital representation of the nominal state outer surface contour come to thereby determine a free state numerical control (NC) machining program for machining the interface locations of the panel assembly to an inner surface contour that reflects the nominal thicknesses of the skin panel based off of the free state outer surface contour.

Referring to FIGS. 19-21, step 104 of the method 100 (FIG. 1) includes acquiring a free state outer surface contour 372 of the panel assembly 266 by scanning the skin panel outer surface 304 of the skin panel 300 while the panel assembly 266 is supported in the free state 280 by the holding fixture 350. In the example shown, the skin panel outer surface 304 is scanned using a scanning device 368 that is supported by a robotic arm 362 of a robotic device 360. The robotic device 360 is movable along a track 364 located on one side of the holding fixture 350. Although shown supported by a robotic device 360, the scanning device 368 may be supported by alternative means, such as a gantry system (not shown), or other automated and/or programmable controlling device.

In the example of FIG. 21, the scanning device 368 is a laser line scanner. However, the skin panel outer surface 304 may be scanned using any type of three-dimensional (3D) metrology system 366, and is not limited to scanning via a laser line scanner. For example, the skin panel outer surface 304 may be scanned using a laser radar device, a surface profiler, a photogrammetry system, or any one of a variety of other types of metrology systems 366 for acquiring a digital representation of the three-dimensional shape of an object. During or after scanning, a processor 370 (FIG. 22) generates a digital representation of the free state outer surface contour 374 of the panel assembly 266 based on the scanning data received from the scanning device 368.

Figure 23:
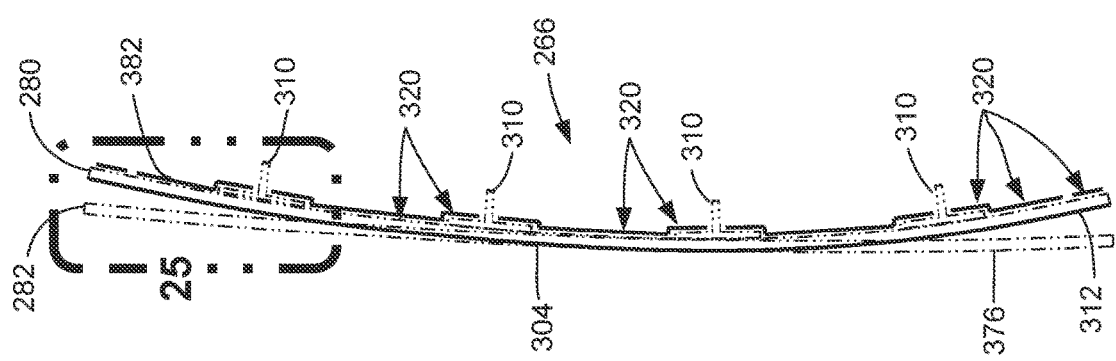
FIG. 23 is a sectional view of the panel assembly in the nominal state superimposed over the panel assembly in the free state.

Referring to FIGS. 22-25, step 106 of the method 100 (FIG. 1) includes developing, using a processor 370, a numerically controlled (NC) machining program (i.e., a free state NC machining program 388) having cutter paths 402 (FIG. 20) configured for machining the interface locations 320 to an inner surface contour (i.e., a free state inner surface contour 382 —FIG. 28) that reflects the nominal thicknesses 306 (FIG. 28) based off of the free state outer surface contour 372. The cutter paths 402 of the free state NC machining program 388 are configured for machining the interface locations 320 on the skin panel 300, and machining the interface locations 320 on the stiffener flanges 312. As mentioned above, the free state outer surface contour 372 is acquired by scanning the skin panel outer surface 304 while the panel assembly 266 is supported in the free state 280 by the holding fixture 350. As shown in FIG. 23 and mentioned above, the geometric shape of the panel assembly 266 in the free state 280 is different than the geometric shape of the panel assembly 266 in the nominal state 282. In the example shown, the radius of curvature of the skin panel outer surface 304 in the free state 280 is smaller than the radius of curvature of the skin panel outer surface 304 in the nominal state 282.

One process for performing step 106 of developing the NC machining program comprises: creating cutter paths 402 (FIG. 28) of a new free state NC machining program 388 mapped to a digital representation of the free state inner surface contour 384. The processor 370 generates the digital representation of the free state inner surface contour 384 by offsetting nominal thicknesses 306 (i.e., the as-designed thicknesses) of the panel assembly 266 from the digital representation of the free state outer surface contour 372 acquired during scanning. More specifically, the processor 370 offsets the nominal thicknesses 306 of the panel assembly 266 respectively from each of a plurality of points in the digital representation of the free state outer surface contour 372. The nominal thicknesses 306 of the panel assembly 266 are extracted from a computer-aided-design (CAD) model 376 of the panel assembly 266.

Figure 25:
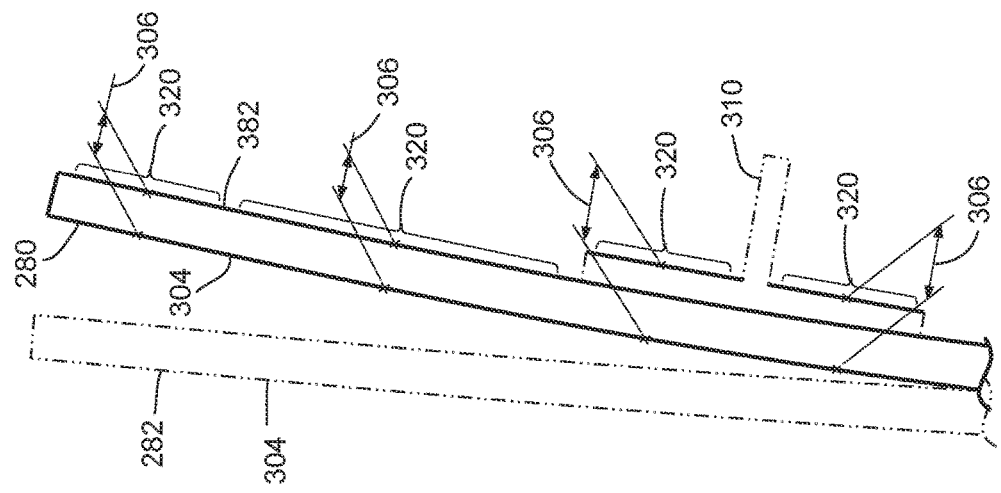
FIG. 25 is an enlarged view of the portion of the panel assembly identified by reference numeral 25 of FIG. 23, and illustrating the nominal thicknesses of FIG. 24 offset from the outer surface contour of the panel assembly in the free state, to thereby define the inner surface contour of the panel assembly.
Figure 24:
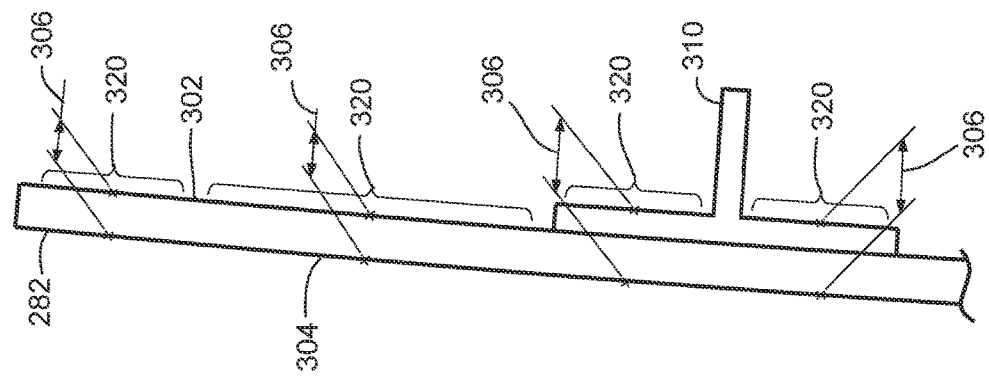
FIG. 24 is a sectional view of a portion of the panel assembly in the nominal state, and illustrating the nominal thicknesses of the panel assembly at different interface locations.

FIG. 24 shows a portion of the panel assembly 266 in the nominal state 282, and illustrates the nominal thicknesses 306 at different interface locations 320 on the panel assembly 266. FIG. 25 shows the same portion of the panel assembly 266 in the free state 280, and illustrates the free state inner surface contour 382, which is generated by offsetting the nominal thicknesses 306 (FIG. 24) of the panel assembly 266 from the free state outer surface contour 372.

In above-describe example of performing step 106, the nominal thicknesses 306 are used as a proxy for generating the inner surface contour of the panel assembly 266. The resulting cutter paths 402 of the new free state NC machining program 388 are configured to machine the sacrificial material 322 at the interface locations 320 in a manner such that the panel assembly 266 has nominal thicknesses 306 at each interface location 320, thereby reducing or eliminating the need for shimming of gaps that may otherwise occur at the interface locations 320 when the panel assembly 266 is attached to mating structure 340. In addition, the cutter paths 402 of the free state NC machining program 388 are configured to machine the sacrificial material 322 at the interface locations 320 in a manner such that when the panel assembly 266 moves into the nominal state 282 during attachment to the mating structure 340, the effects of springback 514 (FIG. 17) are reversed, and the skin panel outer surface 304 assumes the nominal state (i.e., the as-designed contour) of the skin panel outer surface 304.

An alternative process for performing step 106 of developing the free state NC machining program 388 comprises: adjusting, using the processor 370, the cutter paths 402 of an existing nominal state NC machining program 386 in a manner reflecting differences between the free state outer surface contour 372 (FIG. 23) and the nominal state outer surface contour 378 (FIG. 23) of the panel assembly 266 in the nominal state 282. The cutter paths 402 of the nominal state NC machining program 386 are originally configured for machining the interface locations 320 of the panel inner surface of the skin panel 300 to the nominal state 282 inner surface contour when the skin panel 300 is in the nominal state 282. In this alternative process, for each point on the skin panel outer surface 304, the processor 370 calculates the differences between the digital representation of the free state outer surface contour 372 and the digital representation of the nominal state outer surface contour 378.

As mentioned above, the digital representation of the free state outer surface contour 372 is a result of scanning the panel assembly 266 while supported in the free state 280 by the holding fixture 350. The digital representation of the nominal state outer surface contour 378 is extracted from the CAD model 376 of the panel assembly 266. The processor 370 adjusts the cutter paths 402 of the nominal state NC machining program 386 to account for differences between the free state outer surface contour 372 and the nominal state outer surface contour 378. For example, for each point along the cutter paths 402 of the nominal state NC machining program 386, the processor 370 adjusts the spatial location (i.e., the three-dimensional location) of the cutter 400 at each point along the cutter paths 402. In addition, for each point along the cutter paths 402 of the nominal state NC machining program 386, the processor 370 may also adjust the spatial orientation (i.e., the three-dimensional orientation) of the cutter 400 to be locally perpendicular to the surface being machined.

Figure 26:
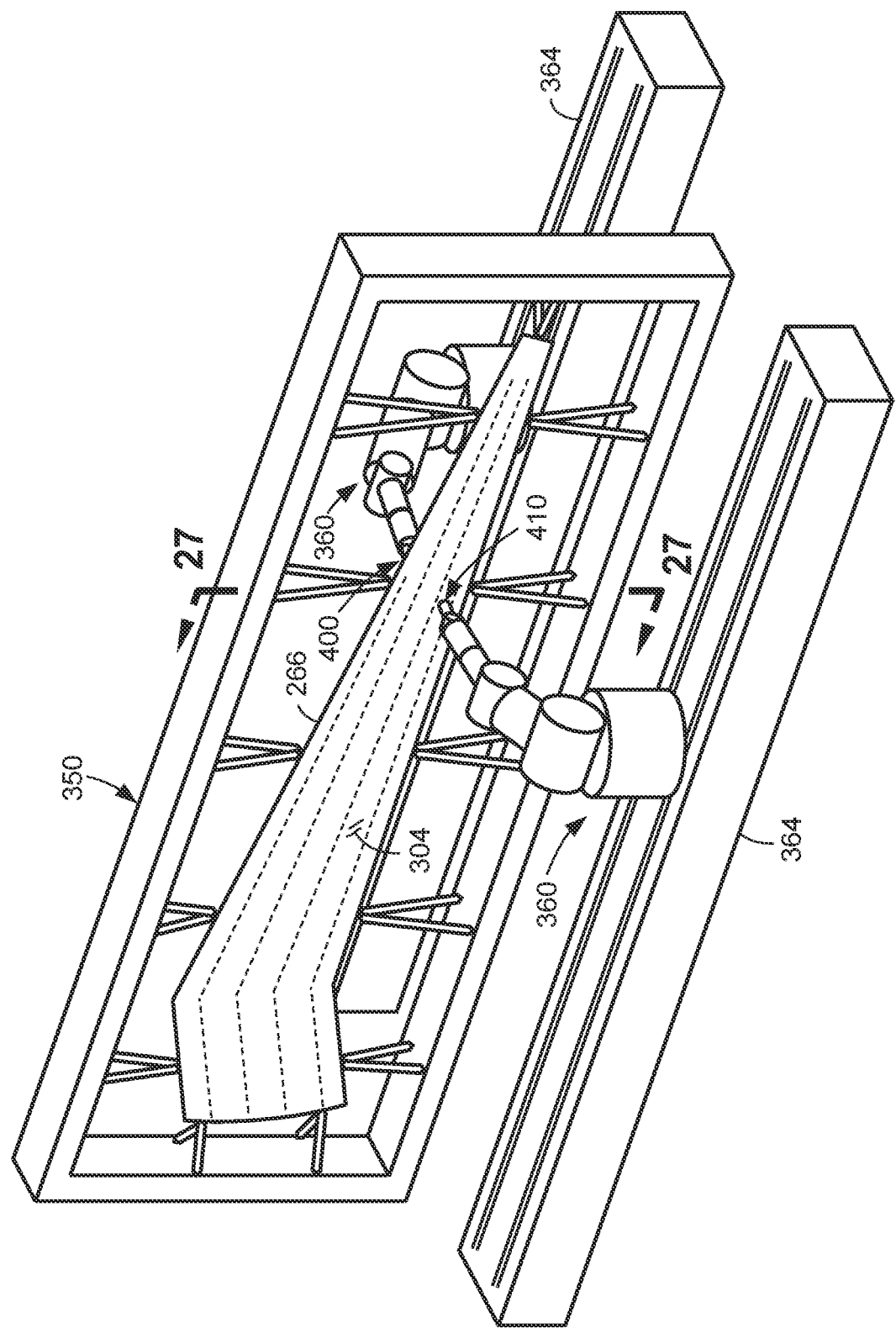
FIG. 26 shows an example of an arrangement for machining the sacrificial material at the interface locations by moving a cutter along cutter paths of the NC machining program while the panel assembly is supported by the holding fixture.
Figure 27:
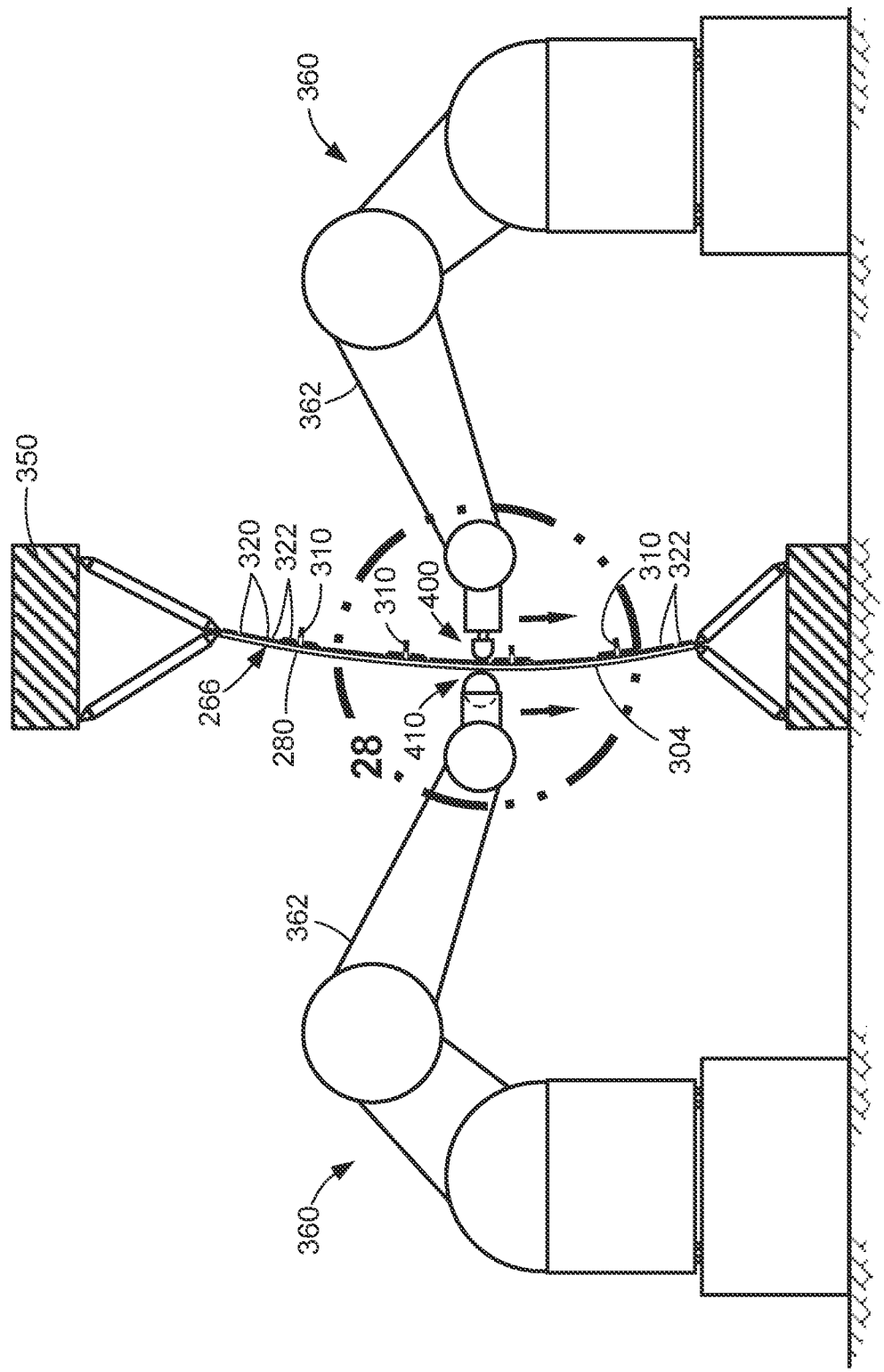
FIG. 27 is a side view taken along line 27-27 of FIG. 26, and illustrating the cutter moving along the cutter path of the panel assembly inner surface, while the cutter machines the sacrificial material at the interface locations on the panel assembly inner surface, while a backing advice applies backing pressure against the skin panel outer surface.
Figure 28:
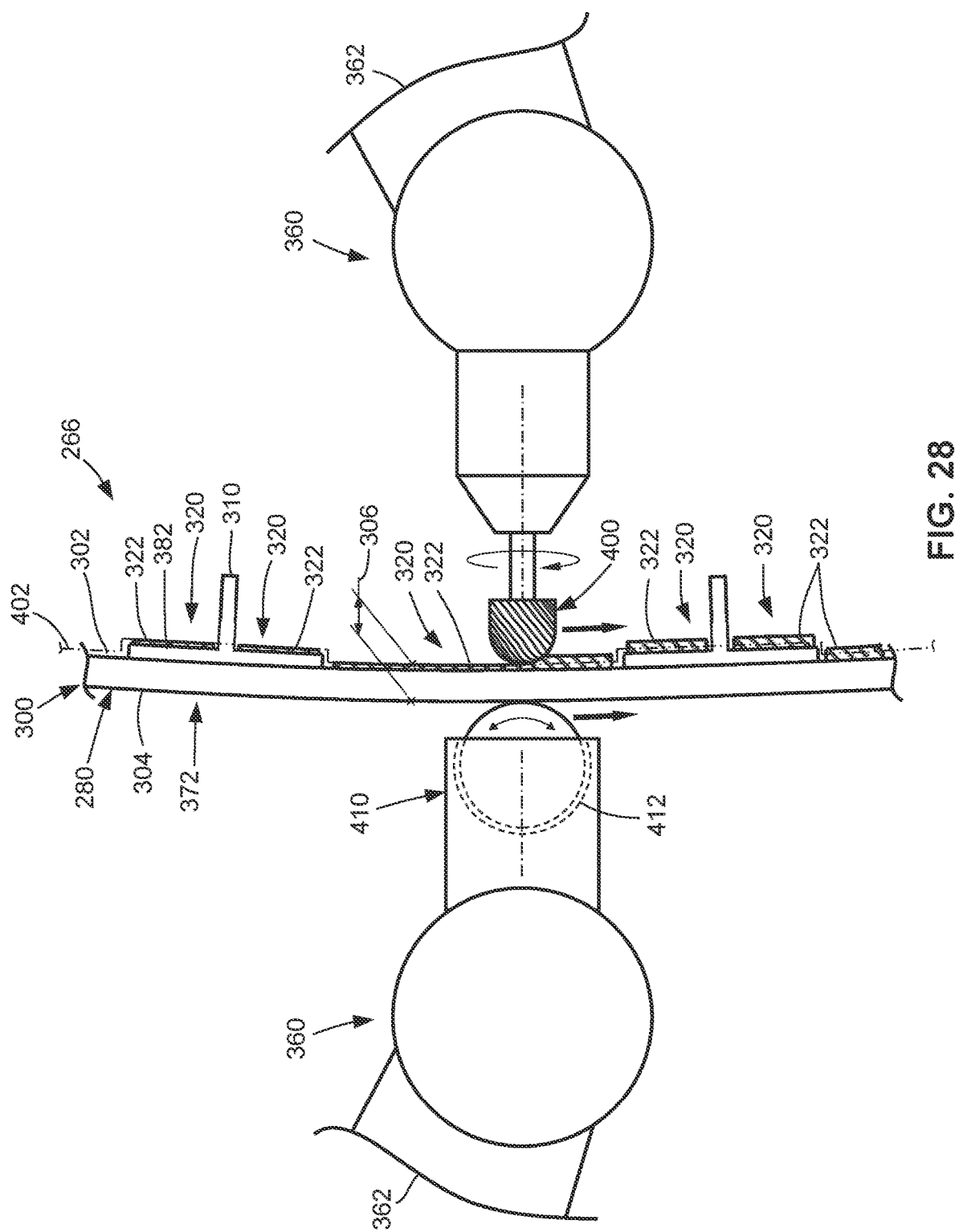
FIG. 28 is an enlarged view of the cutter and the backing device of FIG. 27 during the machining of the sacrificial material at the interface locations.

Referring to FIGS. 26-28, step 108 of the method 100 (FIG. 1) includes machining the sacrificial material 322 at the interface locations 320 by moving a cutter 400 along the cutter paths 402 (FIG. 28) of the free state NC machining program 388 while the panel assembly 266 is supported in the free state 280 by the holding fixture 350, and while the cutter 400 is backed by a backing device 410 applying backing pressure against the skin panel outer surface 304. In the example shown, the cutter 400 is supported by a robotic arm 362 of a robotic device 360 on one side of the holding fixture 350, and the backing device 410 is supported by a robotic arm 362 of a robotic device 360 on an opposite side of the holding fixture 350. Each robotic device 360 is independently movable along a track 364. However, the cutter 400 and the backing device 410 may be supported using any one of a variety of means, and are not limited to being supported by robotic devices 360. For example, the cutter 400 and the backing device 410 may each be independently movable by a gantry system (not shown), or other automated and/or programmable controlling device.

In the example of FIG. 28, the cutter 400 is a high-speed rotary cutter 400, such as an end mill. However, the cutter 400 may be provided in any one of a variety of alternative devices for machining the sacrificial material 322. The backing device 410 is configured to apply backing pressure at the skin panel outer surface 304 opposite the cutter 400 on the skin panel inner surface 302. The backing device 410 is configured to move in a coordinated manner with the cutter 400 as the cutter 400 moves along the cutter paths 402 on the opposite side of the skin panel 300.

The backing device 410 is configured to remain in alignment with the cutter 400 as the cutter 400 moves along the cutter paths 402. For example, the centerline or axis of the backing device 410 remains parallel to and/or generally aligned with the centerline or axis of the cutter 400 during the machining process. The application of backing pressure by the backing device 410 prevents the panel assembly 266 from moving in response to pressure applied by the cutter 400 against the skin panel 300. In the example shown, the backing device 410 is a sphere 412 configured to roll along the skin panel outer surface 304 and apply backing pressure equal in magnitude to the pressure applied by the cutter 400 on the opposite side of the skin panel 300. However, the backing device 410 may be provided in alternative configurations for applying backing pressure to counteract the cutter 400. For example, the backing device 410 may be configured to direct a stream of fluid (not shown) against the skin panel outer surface 304 to counteract the pressure applied by the cutter 400 on the opposite side of the skin panel 300.

Referring to FIG. 29, step 108 of machining the sacrificial material 322 may include machining into the skin panel 300 at one or more of the interface locations 320. In this regard, in order to achieve the nominal thickness 306 at a given interface location 320, the cutter path 402 may be such that the cutter 400 machines off the entire thickness of the sacrificial material 322 at that interface location 320, and then machines into the skin panel 300, until achieving the nominal thickness.

Figure 32:
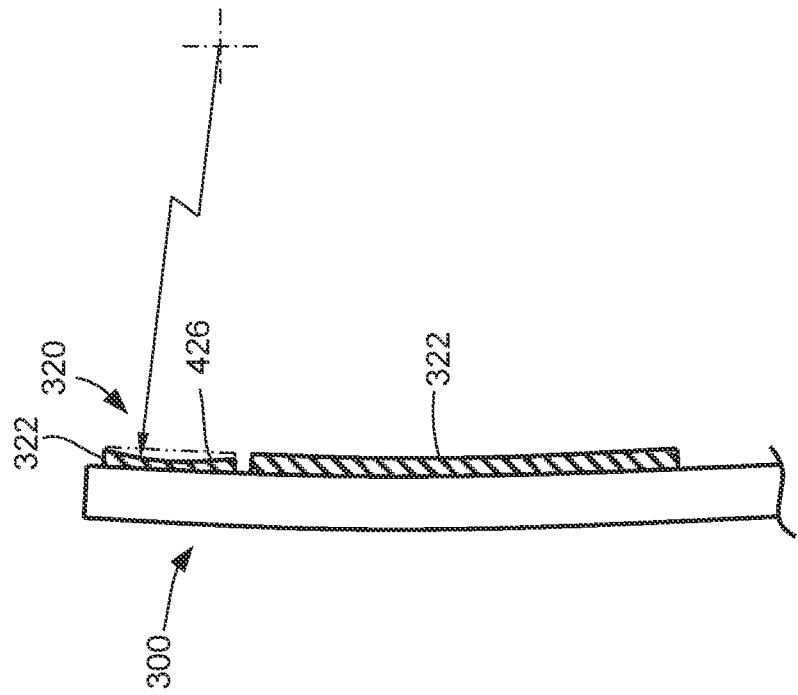
FIG. 32 is a sectional view of an example of the sacrificial material at an interface location having a ruled surface (e.g., a cylindrical surface) as a result of machining according to the NC machining program.
Figure 31:
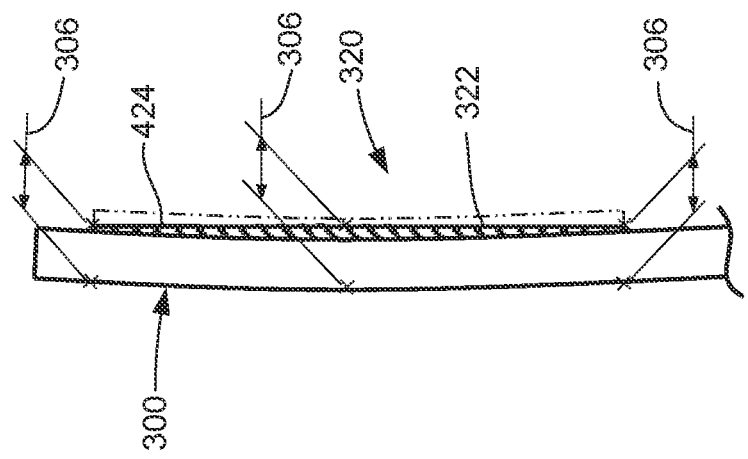
FIG. 31 is a sectional view of an example of the sacrificial material at an interface location having a planar surface as a result of machining according to the NC machining program.

In FIGS. 29-32, shown are several examples of the different types of surfaces that may be machined on the sacrificial material 322 at the interface locations 320. For example, FIG. 29 illustrates machining the panel assembly 266 to achieve a nominal thickness 306 that is a constant thickness 420 at all points of the interface location 320. FIG. 30 illustrates an example of an interface location 320 in which the sacrificial material 322 has been machined to several different nominal thicknesses 306, to result in a linear tapered thickness 422. FIG. 31 illustrates an example in which the sacrificial material 322 has been machined to result in a planar surface 424. FIG. 32 illustrates an example of a ruled surface 426 machined into the sacrificial material 322. Although the ruled surface is shown as a cylindrical surface, other types of ruled surfaces (e.g., a conical surface) may be machined into the sacrificial material 322. In still other examples, a complex surface with different radii of curvature may be machined into the sacrificial material 322. Still other examples of surfaces machined by the cutter 400 include non-uniform rational B-spline (NURBS) surfaces, smooth and continuous surfaces, or any one of a variety of other types of surfaces that achieve nominal thicknesses 306 at the interface locations 320. The type of surface that is machined at each interface location 320 may be dictated in part by the surface of the mating structure 340 at that location.

Figure 37:
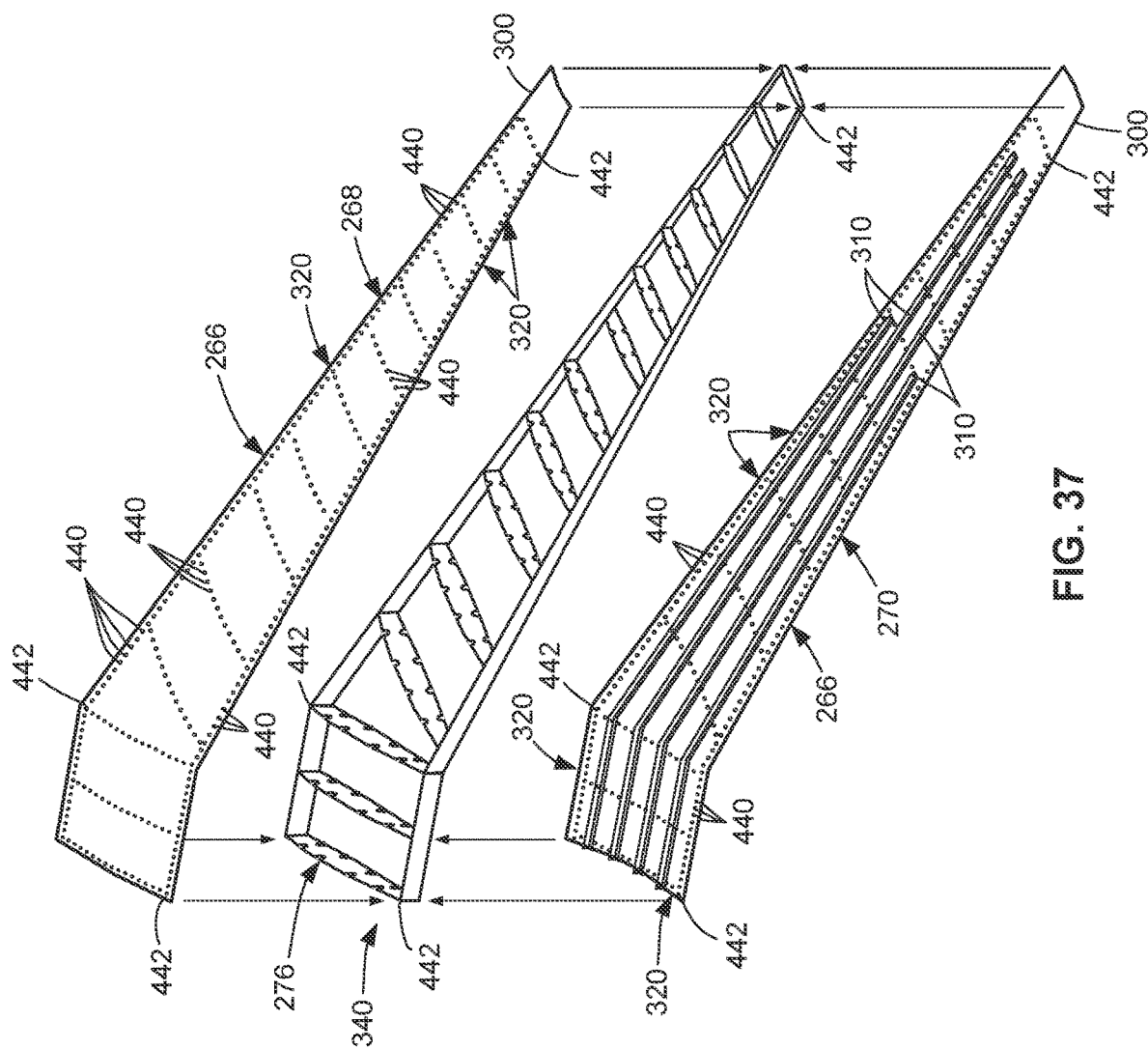
FIG. 37 is an exploded perspective view of an example of an upper panel assembly and a lower panel assembly after machining, drilling, and trimming, and prior to assembly to the front spar, the rear spar, and a plurality of ribs, to thereby result in a wing.
Figure 38:
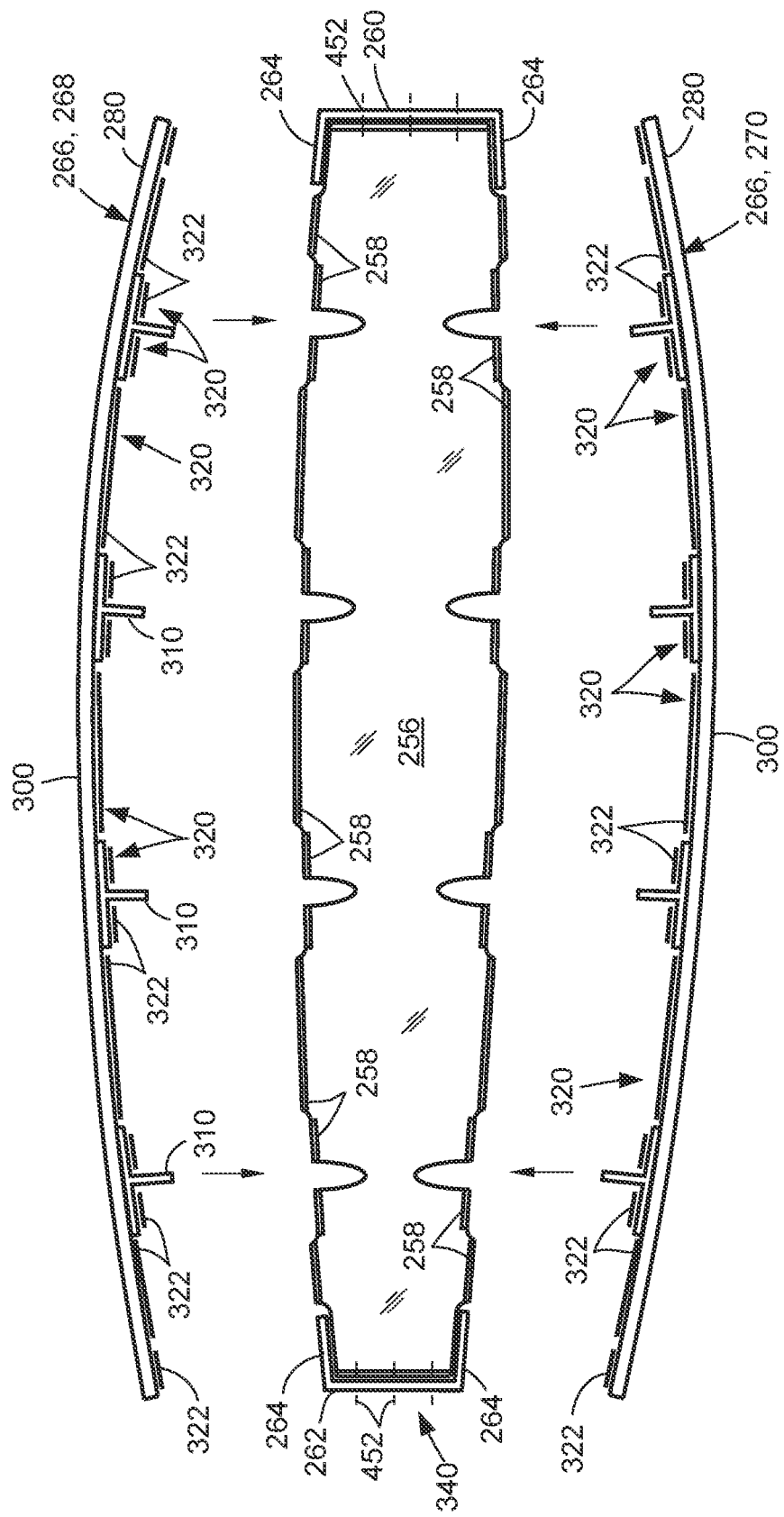
FIG. 38 is an exploded sectional view of the wing of FIG. 37, showing the upper panel assembly and the lower panel assembly in the free state.
Figure 39:
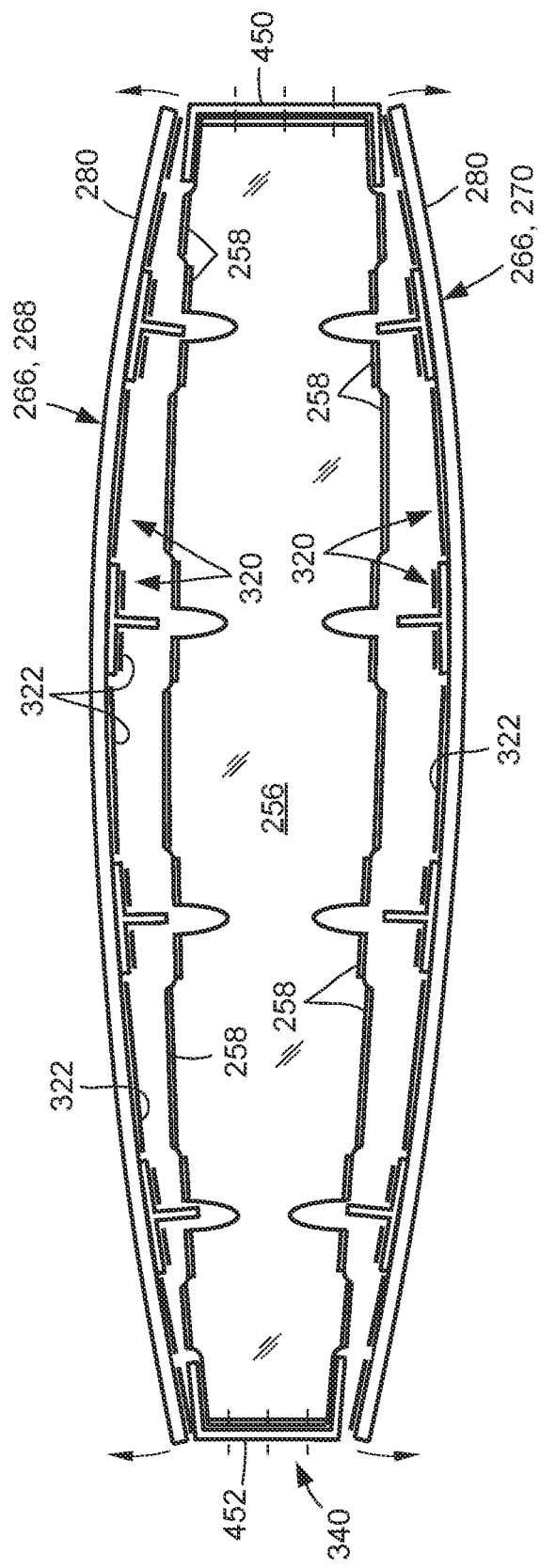
FIG. 39 is a sectional view of the wing of FIG. 38 showing the upper and lower panel assembly during initial positioning against the flanges of the front spar, the rear spar, and the ribs.

After machining the inner surface of the panel assembly 266, the panel assembly 266 is removed from the holding fixture 350, and assembled to the mating structure 340 (e.g., FIGS. 37-39) via a drill-on-assembly process. The panel assembly 266 may include one or more datum features (not shown) to facilitate the indexing or aligning of the panel assembly 266 with the mating structure 340 (FIG. 37). Once the panel assembly 266 is indexed to the mating structure 340, fastener holes 440 (FIG. 37) are installed at the interface locations 320. Pin elements 450 (e.g., tooling pins, temporary fasteners, reusable fasteners such as Clecos™, undersize fasteners, full-size fasteners, etc.) are installed in the fastener holes 440 (FIGS. 40-41) at the interface locations 320 between the panel assembly 266 and the mating structure 340, in a manner causing the geometric shape of the panel assembly 266 to transition into the nominal state 282 (FIG. 40).

Figure 33:
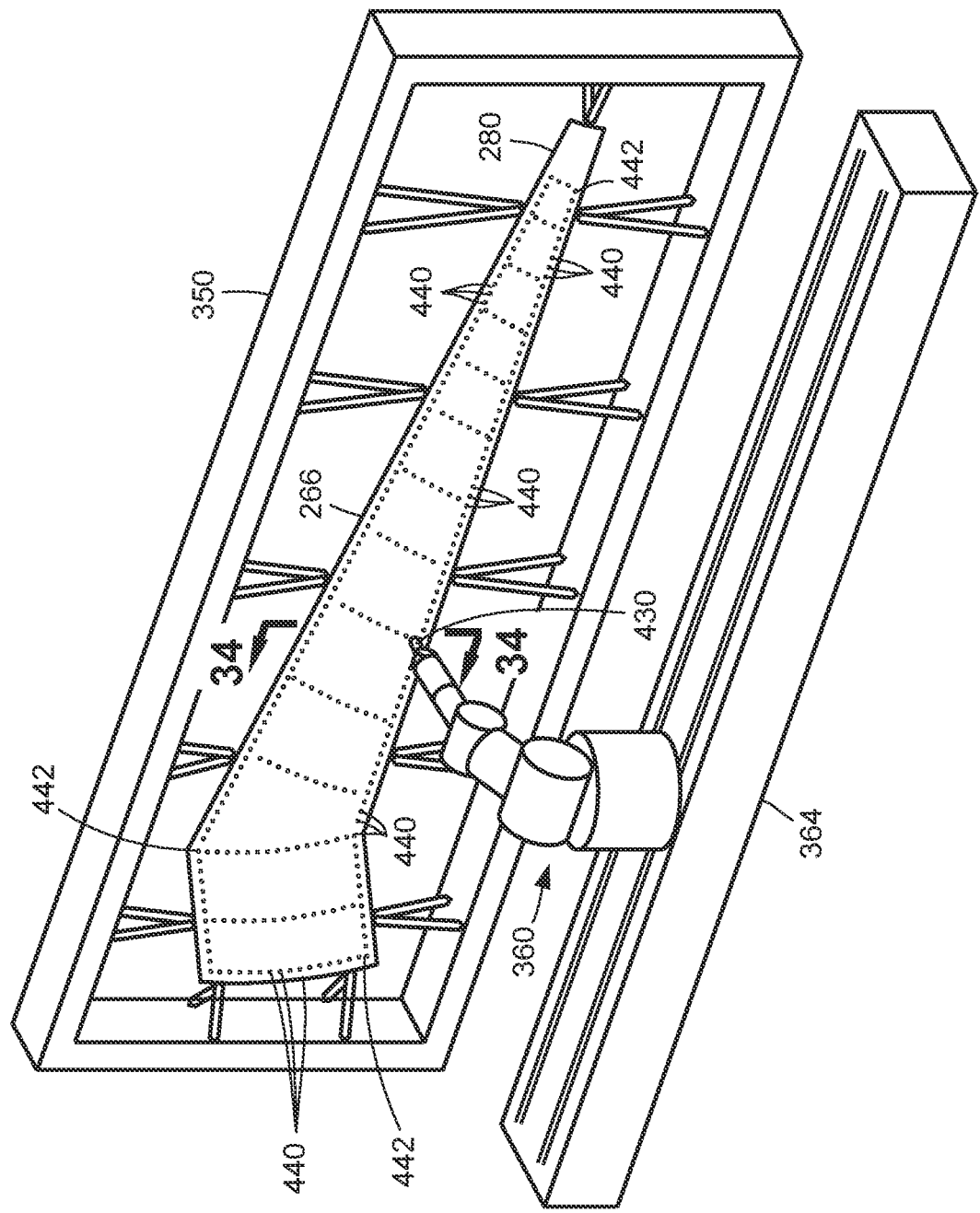
FIG. 33 shows an example of the drilling of index holes and fastener holes in the panel assembly while supported in the free state using the holding fixture.
Figure 34:
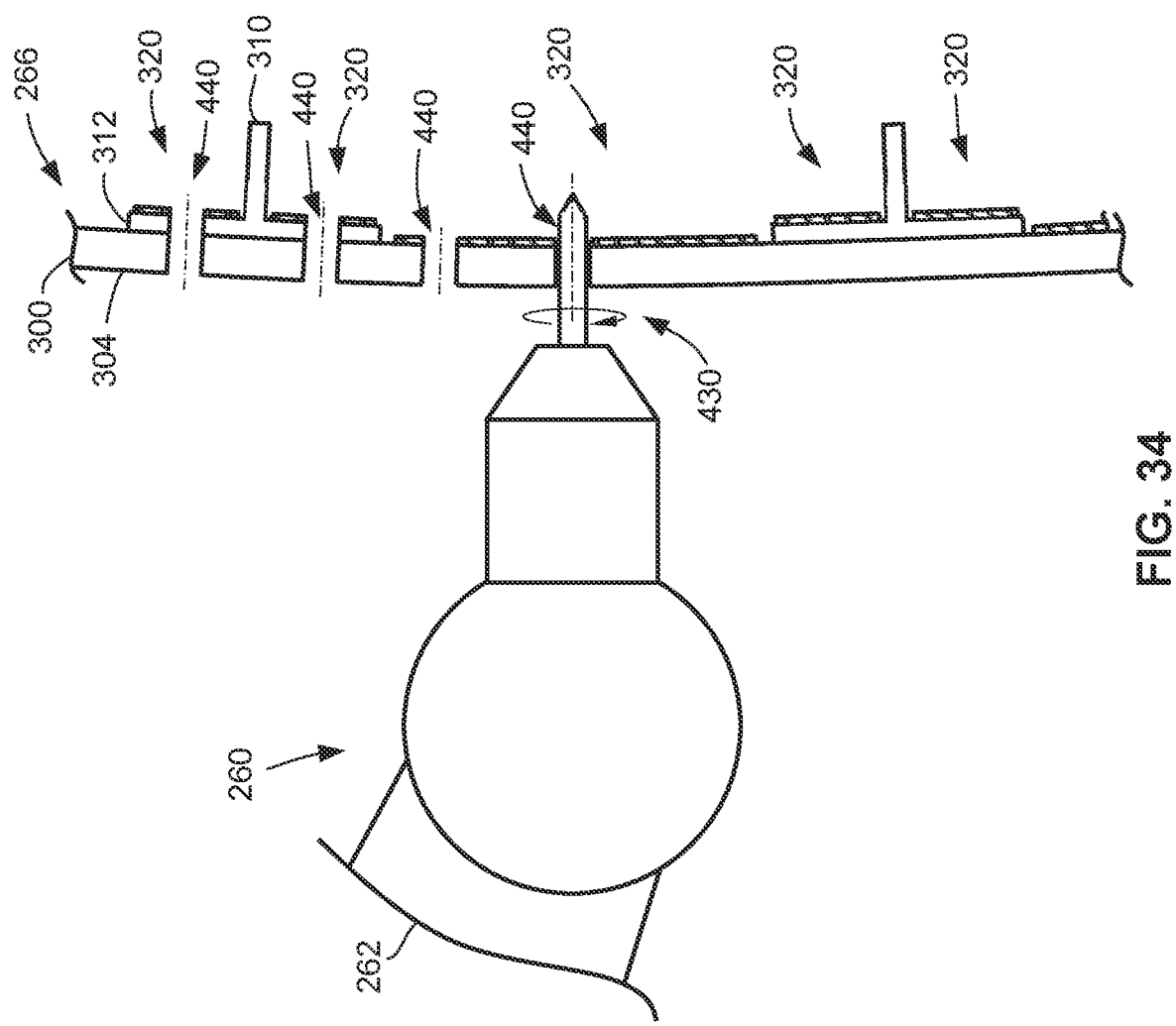
FIG. 34 is a sectional view taken along line 34-34 of FIG. 33, and illustrating the drilling of a fastener hole into the panel assembly according to an NC hole-drilling program.

Referring to FIGS. 33-34, as an alternative to the drill-on-assembly process described above, the method 100 includes drilling a pattern of fastener holes 440, datum features, index holes 442, and/or pilot holes in the panel assembly 266 while supporting the panel assembly 266 in the free state 280 using the holding fixture 350. For example, the method 100 includes drilling a pattern of undersized fastener holes or full-size fastener holes at the interface locations 320 of the panel assembly 266. In the example of FIGS. 33-34, the panel assembly 266 is drilled using a drilling device 430 supported by a robotic arm 362 of a robotic device 360 that is movable along a track 364, similar to the arrangement shown in FIGS. 19-20. However, the drilling device 430 may be movable via a gantry system (not shown), or other automated and/or programmable controlling device. The drilling device 430 is configured to drill fastener holes 440, index holes 442, pilot holes, and/or other datum features in the panel assembly 266.

Examples of datum features include keyholes, slots, grooves, or any other type of indexing feature for aligning the panel assembly 266 with the mating structure 340 (FIG. 37). The fastener holes 440 drilled into the panel assembly 266 are configured to align with fastener holes (not shown) pre-installed in the mating structure 340. When the panel assembly 266 is in the nominal state 282, the fastener holes 440 in the panel assembly 266 are configured to align with fastener holes 440 in the mating structure 340, as described in greater detail below. Mechanical fasteners 452 are installed in the fastener holes 440 at the interface locations 320 to thereby attach the panel assembly 266 to the mating structure 340.

The method 100 optionally includes developing a free state NC hole-drilling program 390 (FIG. 22) for drilling a pattern of fastener holes 440 into the panel assembly 266 while supported in the free state 280 via the holding fixture 350. The free state NC hole-drilling program 390 may be generated by adjusting an existing nominal state NC hole-drilling program (not shown) originally configured for drilling a pattern of fastener holes 440 in the panel assembly 266 when in the nominal state 282. Similar to the above-described process for generating the free state NC machining program 388, the nominal state NC hole-drilling program is adjusted by an amount reflecting differences between the free state outer surface contour 372 and the nominal state outer surface contour 378 of the skin panel 300 in the nominal state 282. For example, the adjustment of the nominal state NC hole drilling program comprises adjusting the three-dimensional location and three-dimensional orientation of the hole centerline of each fastener hole. The drilling device 430 is configured to drill the pattern according to the free state NC hole-drilling program 390 while the panel assembly 266 is supported in the free state 280 by the holding fixture 350. The pattern is drilled in a manner such that when the panel assembly 266 is moved into the nominal state 282, the fastener holes 440 in the panel assembly 266 will align with the fastener holes 440 in the mating structure 340.

Figure 35:
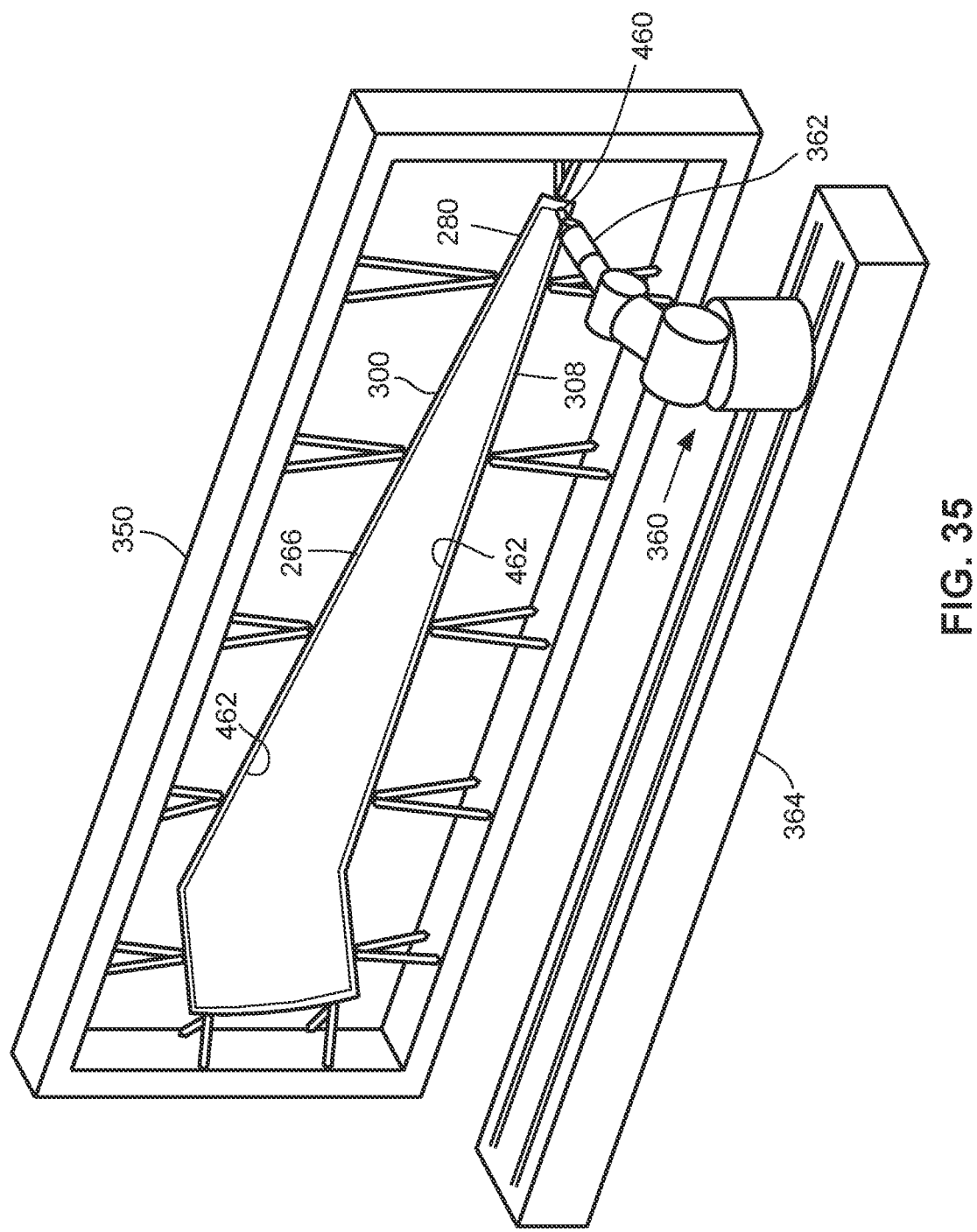
FIG. 35 shows an example of the trimming of the skin panel while the panel assembly is supported in the free state using the holding fixture.
Figure 36:
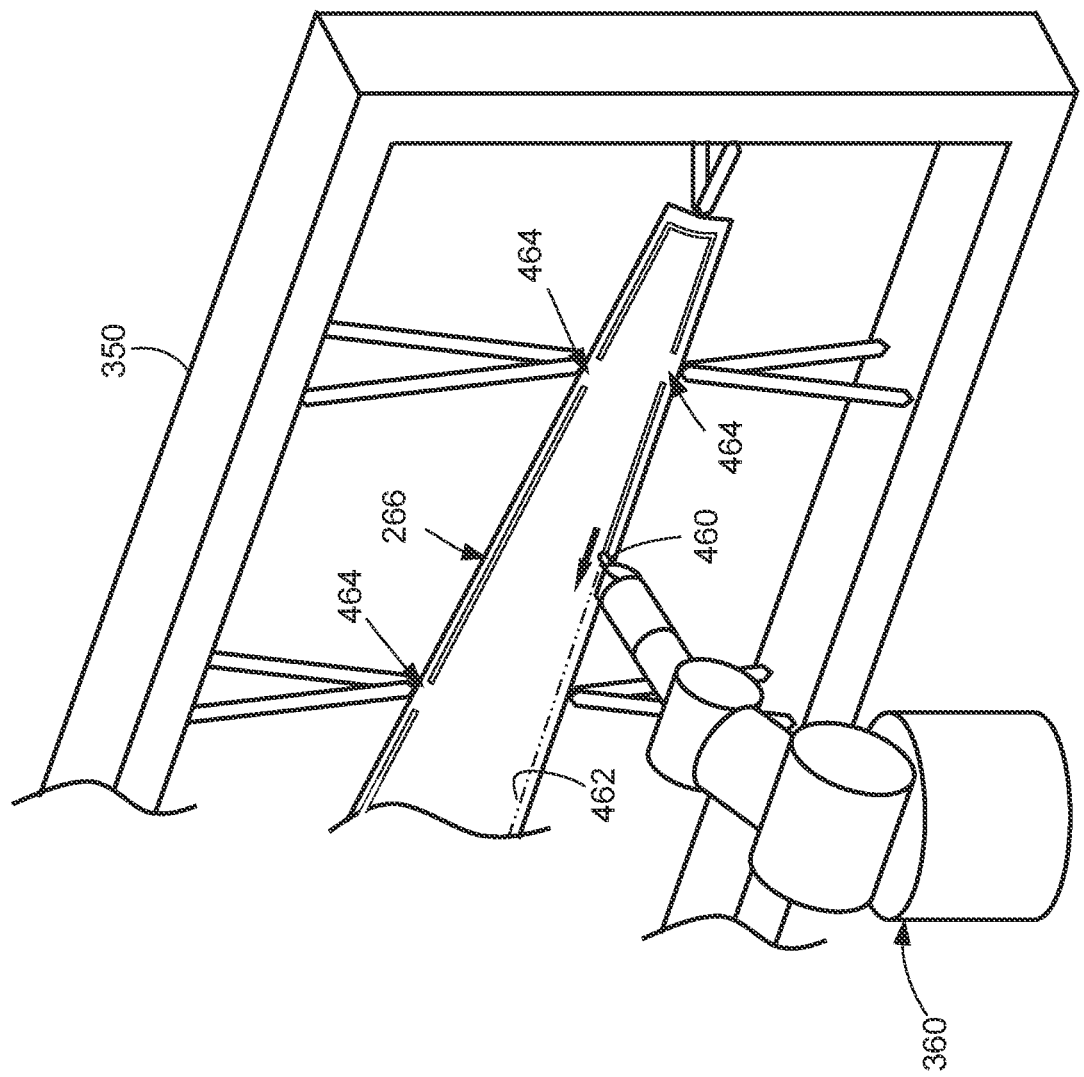
FIG. 36 is an enlarged view of the right hand side of the panel assembly and holding fixture, illustrating the trimming of the skin panel along final trim lines.

Referring to FIGS. 35-36, in addition to machining and optionally drilling the panel assembly 266, the method 100 may further include trimming the skin panel 300 by moving a trimming device 460 along final trim lines 462 of the skin panel 300 while the panel assembly 266 is supported in the free state 280 via the holding fixture 350. In the example shown, the final trim lines 462 are located inboard of the perimeter edges 308. The panel assembly 266 may be trimmed using a trimming device 460 supported by a robotic arm 362 of a robotic device 360 movable along a track 364. However, the trimming device 460 may be moved by a gantry system (not shown) or other suitable means, such as an automated and/or programmable controlling device. Trimming of the panel assembly 266 may include forming one or more openings (e.g., access holes, inspection holes—not shown) in the skin panel 300. During trimming, the panel assembly 266 remains supported by the holding fixture 350 by narrow tabs 464 located at spaced intervals along the final trim lines 462. After the panel assembly 266 is removed from the holding fixture 350, the tabs 464 are severed to thereby separate the trimmed-off portions from the trimmed skin panel 300.

The method 100 may optionally include developing a free state NC trimming program 392 (FIG. 22) for trimming the panel assembly 266 while supported in the free state 280 using the holding fixture 350. Similar to the above-described process for developing the free state NC hole-drilling program 390, the free state NC trimming program 392 may be developed by adjusting an existing nominal state NC trimming program (not shown) originally configured for trimming the panel assembly 266 when in the nominal state 282. The nominal state NC trimming program is adjusted by an amount reflecting differences between the free state outer surface contour 372 and the nominal state outer surface contour 378 of the skin panel 300.

After the panel assembly 266 is removed from the holding fixture 350 after machining, drilling, and (optionally) trimming, the method 100 further includes indexing the mating structure 340 and the panel assembly 266 to each other, using one or more datum features, such as index holes 442 formed in the panel assembly 266 and/or in the mating structure 340. Indexing the mating structure 340 and the panel assembly 266 to each other comprises either: indexing the mating structure 340 to the panel assembly 266, or indexing the panel assembly 266 to the mating structure 340. The mating structure 340 is provided with fastener holes 440 (FIGS. 40-41) at interface locations 320 on the mating structure 340. Once the panel assembly 266 and the mating structure 340 are indexed to each other, the method 100 includes installing pin elements 450 (e.g., tooling pins, temporary fasteners, full-size fasteners, etc.) in the fastener holes 440 at the interface locations 320 to couple the panel assembly 266 to the mating structure 340. The mating structure 340 is preferably built to nominal dimensions. As a result, the process of fastening the panel assembly 266 to the mating structure 340 at the interface locations 320 causes the geometric shape of the panel assembly 266 to transition into the nominal state 282 (e.g., FIG. 41).

Referring to FIGS. 37-41, shown is a process for assembling a wing 240 of an aircraft 200. As mentioned above, the wing 240 is an aerostructure 202 having an upper panel assembly 268 and a lower panel assembly 270. The process of manufacturing the wing 240 includes separately machining, drilling, and (optionally) trimming each of the upper and lower panel assemblies 268, 270 while supported in the free state 280 by the holding fixture 350. After removal from their holding fixtures 350, the method 100 includes indexing the upper and lower panel assemblies 268, 270 and the mating structure 340 to each other.

In one example of assembling the wing 240, the lower panel assembly 270 is supported in a free state 280 (FIGS. 38-39) by a panel assembly fixture (not shown), and the front spar 260, rear spar 262, and ribs 256 are indexed to the lower panel assembly 270. The ribs 256 are fastened to the front spar 260 and the rear spar 262 to thereby form a ladder assembly 276 (FIG. 37), and pin elements 450 (e.g., temporary fasteners, full-size fasteners, etc.) are installed in the fastener holes 440 at the interface locations 320 between the lower panel assembly 270 and the front spar 260, the rear spar 262, and the ribs 256. Although not shown, fastener holes are pre-installed in the spar flanges 264 of the front and rear spars 260, 262, and in the rib flanges 258 of the ribs 256. The spars 260, 262 and ribs 256 of the ladder assembly 276 are preferably built to nominal dimensions, which results in the lower panel assembly 270 gradually conforming to its nominal state 282 (FIG. 40) as the pin elements 450 (e.g., temporary fasteners, full-size fasteners, etc.) are installed at the interface locations 320, as shown in FIG. 41. After the spars 260, 262 and ribs 256 are attached to the lower panel assembly 270, the upper panel assembly 268 in the free state 280 (FIGS. 38-39) is indexed to the ladder assembly 276, and pin elements 450 are installed in the fastener holes 440 at the interface locations 320, thereby conforming the upper panel assembly 268 into its nominal state 282 (e.g., FIGS. 40-41).

In an alternative example of manufacturing the wing 240, the spars 260, 262 and ribs 256 are sequentially indexed and attached to the upper panel assembly 268 to thereby form the ladder assembly 276, after which the lower panel assembly 270 is indexed and attached to the ladder assembly 276. In still another example of manufacturing the wing 240, the front spar 260, the rear spar 262, and the ribs 256 are interconnected to form the ladder assembly 276, after which the upper or lower panel assembly 268, 270 is indexed and fastened to the ladder assembly 276, followed by indexing and fastening the remaining upper or lower panel assembly 268, 270 to the ladder assembly 276. FIG. 41 shows a portion of the wing 240 structural assembly 342 after installation of the fasteners 452 into the fastener holes 440 at the interface locations 320. Also shown is the post-machined sacrificial material 322, resulting in nominal thicknesses 306 at each interface location 320.

As mentioned above, because the front spar 260, the rear spar 262, and the ribs 256 are built to nominal dimensions, and because the panel assembly 266 (i.e., the sacrificial material 322) is machined to nominal thicknesses 306 at each interface location 320, the occurrence of gaps between the panel assembly 266 and the rib 256 and spar flanges 264 is reduced or eliminated, which reduces or eliminates the need for shimming, as is typically required in conventional manufacturing and assembly methods. Any gaps that do occur are preferably within design allowances, such that shimming is unnecessary. A further advantage of machining each panel assembly 266 to its nominal thicknesses 306 is that all panel assemblies 266 can be interchangeably used with any mating structure 340 of the same configuration. For example, in the case of a wing 240, the ability to machine each upper panel assembly 268 and lower panel assembly 270 to nominal thicknesses 306 allows for the interchangeability of the upper and lower panel assembly 268, 270 with any ladder assembly 276 of the same configuration, such that no panel assembly is limited to use on a single production unit.

In addition to the interchangeability of panel assemblies 266 and reducing the need for shimming, the presently-disclosed method 100 results in structural assemblies 342 (e.g., wings 240, horizontal stabilizers 218, etc.) that have highly accurate (i.e., nominal) surface contours. In aircraft production, the ability to produce highly accurate surface contours translates into improved aerodynamic performance of the aircraft 200. For example, the ability to manufacture the wings 240 to an as-designed aerodynamic contour reduces or eliminates the occurrence of drag-generating discontinuities (e.g., steps) that may otherwise occur in the outer mold line (OML). In addition to aerodynamic performance benefits, the use of sacrificial material 322 in the presently-disclosed method 100 results in significant savings in manufacturing costs and production flow time. For example, the ability to perform the steps of machining, trimming, and drilling in one tool setup, without unloading the panel assembly 266 from the holding fixture 350 and without changing the orientation of the panel assembly 266, results in significant savings in manufacturing costs and production flow time.

Many modifications and other versions and examples of the disclosure will come to mind to one skilled in the art to which this disclosure pertains having the benefit of the teachings presented in the foregoing descriptions and the associated drawings. The versions and examples described herein are meant to be illustrative and are not intended to be limiting or exhaustive. Although specific terms are employed herein, they are used in a generic and descriptive sense only and not for purposes of limitation. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled.

What is claimed is:

1. A method of manufacturing a panel assembly, comprising:
   supporting the panel assembly in a free state using a holding fixture in which the panel assembly has a geometric shape that is different than the geometric shape of the panel assembly in an as-designed nominal state, the panel assembly comprising a skin panel and sacrificial material coupled to a skin panel inner surface respectively at interface locations for coupling the panel assembly to mating structure;
   acquiring a free state outer surface contour of the panel assembly by scanning a skin panel outer surface of the skin panel while the panel assembly is supported by the holding fixture;
   developing a numerically controlled (NC) machining program having cutter paths configured for machining the interface locations to an inner surface contour that reflects nominal thicknesses of the panel assembly based off of the free state outer surface contour; and machining the sacrificial material at the interface locations by moving a cutter along the cutter paths while the panel assembly is supported by the holding fixture, and while the cutter is backed by a backing device applying backing pressure against the skin panel outer surface while the backing device moves in a coordinated manner in alignment with the cutter as the cutter moves along the cutter paths on the opposite side of the skin panel.

2. The method of claim 1, wherein developing the NC machining program for machining the interface locations comprises:

creating cutter paths mapped to a digital representation of the inner surface contour generated by offsetting the nominal thicknesses from a digital representation of the free state outer surface contour.

3. The method of claim 1, wherein developing the NC machining program for machining the interface locations comprises:

adjusting cutter paths of an existing NC machining program in a manner reflecting differences between the free state outer surface contour and a nominal state outer surface contour of the panel assembly in the nominal state; and the existing cutter paths originally configured for machining the panel inner surface of the skin panel when the skin panel is in the nominal state.

4. The method of claim 1, wherein machining the sacrificial material comprises:

machining into the skin panel at one or more of the interface locations.

5. The method of claim 1, wherein machining the sacrificial material comprises:

machining the sacrificial material of at least one of the interface locations to result in one of the following characteristics at the interface location:
a constant thickness of the skin panel;
a linear tapered thickness of the skin panel;
a planar surface;
a ruled surface;
a cylindrical surface;
a conical surface;
a complex surface;
a non-uniform rational b-spline (NURBS) surface;
a smooth and continuous surface.

6. The method of claim 1, further comprising:
installing the sacrificial material respectively at the interface locations on the skin panel, the sacrificial material is comprised of at least one of the following:
fiber-reinforced polymer matrix material, including one of fiberglass or carbon-fiber-reinforced polymeric material;
non-fibrous polymeric material;
metallic material; and
fiber metal laminate, including glass-laminate-aluminum reinforced epoxy.

7. The method of claim 1, wherein acquiring the free state outer surface contour of the panel assembly comprises:
using at least one of the following devices to capture the free state outer surface contour: a laser scanner, a laser line scanner, a laser radar device, a laser tracker, a surface profiler, a photogrammetry system, any device capable of measuring and recording three-dimensional point data or surface data.

8. The method of claim 1, wherein the panel assembly includes one or more structural elements coupled to the skin panel inner surface, at least one of the structural elements has sacrificial material at an interface location on the structural element, the step of developing the NC machining program for machining the interface locations comprising:
developing the NC machining program having cutter paths configured for machining the interface locations on the skin panel and on the structural elements.

9. The method of claim 1, further comprising:
drilling a pattern of at least one of fastener holes, datum features, index holes, and pilot holes in the panel assembly while supporting the panel assembly in the free state using the holding fixture.

10. The method of claim 9, wherein prior to drilling the pattern, the method comprises:
developing an NC hole-drilling program for drilling the pattern into the panel assembly while supported in the free state using the holding fixture, by adjusting an existing NC hole-drilling program originally configured for drilling the pattern into the panel assembly when in the nominal state, the existing NC hole-drilling program being adjusted by an amount reflecting differences between the free state outer surface contour and a nominal state outer surface contour of the skin panel in the nominal state.

11. The method of claim 9, wherein after the panel assembly is removed from the holding fixture, the method further comprises:
indexing the mating structure and the panel assembly to each other, the mating structure having fastener holes pre-installed at interface locations on the mating structure independent of the installation of the fastener holes in the panel assembly; and
installing pin elements in the fastener holes at the interface locations between the panel assembly and the mating structure, thereby causing the geometric shape of the panel assembly to change from the free state toward the nominal state.

12. The method of claim 11, wherein indexing the mating structure and the panel assembly to each other comprises one of the following:
indexing the mating structure to the panel assembly;
indexing the panel assembly to the mating structure.

13. The method of claim 1, further comprising:
trimming the skin panel along one or more final trim lines, while supporting the panel assembly in the free state using the holding fixture.

14. A method of manufacturing a panel assembly, comprising:
supporting a panel assembly in a free state using a holding fixture, the panel assembly comprising a skin panel, and sacrificial material coupled to a skin panel inner surface respectively at interface locations for coupling the panel assembly to mating structure;
acquiring a free state outer surface contour of the panel assembly by scanning a skin panel outer surface of the skin panel while the panel assembly is supported by the holding fixture;
developing a numerical control (NC) machining program having cutter paths configured for machining the interface locations to an inner surface contour that is based on the free state outer surface contour;
machining the sacrificial material by moving a cutter along the cutter paths while the panel assembly is supported by the holding fixture, and while the cutter is backed by a backing device applying backing pressure against the skin panel outer surface while the backing device moves in a coordinated manner in alignment with the cutter as the cutter moves along the cutter paths on the opposite side of the skin panel;

removing the panel assembly from the holding fixture; and indexing the panel assembly and the mating structure to each other, and fastening the panel assembly and the mating structure together to result in a structural assembly.

15. The method of claim 14, wherein:

the panel assembly has fastener holes at the interface locations;

the mating structure has fastener holes pre-installed prior to indexing the mating structure and the panel assembly to each other; and when the mating structure and the panel assembly are indexed to each other, the fastener holes in the mating structure are aligned with the fastener holes in the panel assembly.

16. A method of manufacturing an aerostructure of an aircraft, comprising:

supporting a panel assembly of an aerostructure in a free state using a holding fixture in which the panel assembly has a geometric shape that is different than the geometric shape of the panel assembly in an as-designed nominal state, the panel assembly comprising a skin panel and sacrificial material coupled to a skin panel inner surface respectively at interface locations for coupling the panel assembly to mating structure, the skin panel having a skin panel outer surface configured to define an outer mold line (OML) that forms an aerodynamic contour of the aerostructure;

acquiring a free state outer surface contour of the skin panel by scanning the skin panel outer surface while the panel assembly is supported by the holding fixture in the free state;

developing a numerically controlled (NC) machining program having cutter paths configured for machining the interface locations to an inner surface contour that reflects nominal thicknesses of the panel assembly based on the free state outer surface contour; and machining the sacrificial material by moving a cutter along the cutter paths while the panel assembly is supported by the holding fixture, and while the cutter is backed by a backing device applying backing pressure against the skin panel outer surface while the backing device moves in a coordinated manner in alignment with the cutter as the cutter moves along the cutter paths on the opposite side of the skin panel.

17. The method of claim 16, wherein the aerostructure comprises one of the following:

a wing, an aileron, a flap, a wing tip device, a winglet, a horizontal stabilizer, an elevator, a vertical stabilizer, a rudder, a fuselage panel, an engine nacelle, an engine cowling.

18. The method of claim 17, wherein the aerostructure has an upper panel assembly and a lower panel assembly, each having stringers extending along a lengthwise direction respectively of the skin panels, the sacrificial material coupled to the skin panel inner surface at interface locations for coupling the panel assembly to internal structural components of the aerostructure, the method further comprising:

removing one of the upper or lower panel assembly from the holding fixture after machining the sacrificial material;

indexing one of the upper or lower panel assembly to the internal structural components;

installing pin elements in fastener holes at the interface locations between the internal structural components and the upper or lower panel assembly;

indexing a remaining one of the upper or lower panel assembly to the internal structural components; and installing pin elements in fastener holes at the interface locations between the internal structural components and the remaining one of the upper or lower panel assembly, thereby resulting in the aerostructure.

19. The method of claim 18, wherein:

the internal structural components include a front spar, a rear spar, and ribs.

20. The method of claim 19, wherein indexing the upper or lower panel assembly to the internal structural components comprises one of the following:

indexing the upper or lower panel assembly to the front spar, the rear spar, and the ribs;

indexing the front spar, the rear spar, and the ribs to one of the upper or lower panel assembly.

* * * * *